US012424094B2

(12) United States Patent
Morvan et al.

(10) Patent No.: US 12,424,094 B2
(45) Date of Patent: Sep. 23, 2025

(54) COMMUNICATION WITHIN AN INTELLIGENT TRANSPORT SYSTEM

(71) Applicant: CANON KABUSHIKI KAISHA, Tokyo (JP)

(72) Inventors: Isabelle Morvan, Chantepie (FR); Eric Nassor, Thorigne-Fouillard (FR); Julien Sevin, Saint Aubin du Cormier (FR); Brice Le Houerou, Acigne (FR); Lionel Tocze, Saint Domineuc (FR); Hervé Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 18/153,297

(22) Filed: Jan. 11, 2023

(65) Prior Publication Data

US 2023/0230479 A1 Jul. 20, 2023

(30) Foreign Application Priority Data

Jan. 14, 2022 (GB) ...................................... 2200487
Jun. 30, 2022 (GB) ...................................... 2209600

(51) Int. Cl.
*G08G 1/0967* (2006.01)
*G08G 1/01* (2006.01)

(52) U.S. Cl.
CPC ..... *G08G 1/096783* (2013.01); *G08G 1/0133* (2013.01)

(58) Field of Classification Search
CPC ....................... G08G 1/096783; G08G 1/0133
See application file for complete search history.

(56) References Cited

U.S. PATENT DOCUMENTS

| | | | | |
|---|---|---|---|---|
| 10,373,494 | B1 | 8/2019 | Krysiuk | |
| 10,841,761 | B2 | 11/2020 | Zhang et al. | |
| 2011/0298603 | A1 | 12/2011 | King et al. | |
| 2019/0268447 | A1 | 8/2019 | Yang et al. | |
| 2019/0325751 | A1 | 10/2019 | Altintas et al. | |
| 2019/0339082 | A1 | 11/2019 | Doig et al. | |
| 2020/0164844 | A1 | 5/2020 | Jung et al. | |
| 2021/0067926 | A1 * | 3/2021 | Hwang | H04W 4/44 |

(Continued)

FOREIGN PATENT DOCUMENTS

| | | | |
|---|---|---|---|
| EP | 3691300 | A1 | 8/2020 |
| EP | 3829200 | A2 | 6/2021 |

(Continued)

OTHER PUBLICATIONS

Intelligent Transport System (ITS); Vehicular Communications; Basic Set of Applications; Specification of the Collective Perception Service, ETSI TS 103 324 V0.0.22 (May 2021).

(Continued)

*Primary Examiner* — Michael D Lang
(74) *Attorney, Agent, or Firm* — Canon U.S.A., Inc. IP Division

(57) ABSTRACT

The present invention regards Cooperative Intelligent Transportation Systems, C-ITS. In response to detecting at least one situation involving at least one object detected within an area monitored by the ITS, a Collective Perception Message, CPM, is generated and transmitted. The CPM comprises a reference to the at least one object and an indication to indicate that the at least one object is involved in the at least one situation.

6 Claims, 16 Drawing Sheets

(56) References Cited

U.S. PATENT DOCUMENTS

| | | | |
|---|---|---|---|
| 2021/0082210 | A1 | 3/2021 | Sakr |
| 2021/0129862 | A1 | 5/2021 | Kim |
| 2022/0005353 | A1 | 1/2022 | Hwang et al. |
| 2022/0103986 | A1 | 3/2022 | Hwang et al. |
| 2022/0132524 | A1 | 4/2022 | Mueck |
| 2022/0150333 | A1 | 5/2022 | Nylander |
| 2022/0332350 | A1 | 10/2022 | Jha |

FOREIGN PATENT DOCUMENTS

| | | | |
|---|---|---|---|
| GB | 2611540 | A | 4/2023 |
| JP | 2008015316 | A | 1/2008 |
| JP | 2011158636 | A | 8/2011 |
| JP | 2018530810 | A | 10/2018 |
| JP | 2018534692 | A | 11/2018 |
| JP | 2021522604 | A | 8/2021 |
| WO | 2018100661 | A | 6/2018 |
| WO | 2020145438 | A1 | 7/2020 |
| WO | 2020/257642 | A1 | 12/2020 |
| WO | 2021252174 | A1 | 12/2021 |

OTHER PUBLICATIONS

Intelligent Transport Systems (ITS); Vehicular Communications; Basic Set of Applications; Part 2: Specification of Cooperative, Awareness Basic ServiceFinal draft, ETSI EN 302 637-2.

Intelligent Transport Systems (ITS); Vehicular Communications; Basic Set of Applications; Part 3: Specifications of Decentralized Environmental Notification Basic Service, ETSI EN 302 637-3.

Intelligent Transport Systems (ITS); Vehicular Communications; Basic Set of Applications; Analysis of the Collective Perception Service (CPS); Release 2; ETSI TR 103 562 v2.1.1 (Dec. 2019), XP014360260.

CAR 2 CAR Communication Consortium, Triggering Conditions and Data Quality Pre-Crash Information, XP093024322.

Intelligent Transport Systems (ITS); Vehicular Communications; Basic Set of Applications; Part 2: Specification of Cooperative Awareness Basic Service; ETSI EN 302 637-2 v1.4.1; (Apr. 2019).

Intelligent Transport Systems (ITS)' Vehicular Communications; Basic Set of Applications; part 3; Specifications of Decentralized Environmental Notification Basic Service; ETSI EN 302 637-3 V1.3.1 (Apr. 2019).

Intelligent Transport System (ITS); Vehicular Communications; Basic Set of Applications; Specification of the Collective Perception Service, ETSI TS 103 324 V0.0.18 (May 2020).

Intelligent Transport Systems (ITS); Communications Architecture, ETSI EN 302 665 V1.1.1 (Sep. 2010).

Intelligent Transport Systems—Communications access for land mobiles (CALM)—Architecture, ISO 21217, second Edition, Apr. 1, 2014.

Intelligent Transport System (ITS); Vehicular Communications; Basic Set of Applications; Specification of the Collective Perception Service, ETSI TS 103 324 V0.0.20 (Feb. 2021).

Intelligent Transport System (ITS); Vehicular Communications; Basic Set of Applications; Part 2: Specification of the Awareness Basic Service, ETSI EN 637-2 V1.4.1, (Jan. 2019).

Intelligent Transport Systems (ITS); Vehicular Communications; Basic Set of Applications; Facilities layer protocols and communication requirements for infrastructure services, ETSI TS 103 301 V1.3.1 (Feb. 2020).

* cited by examiner

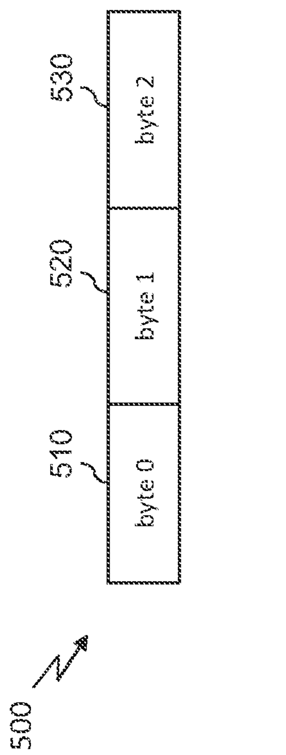

540

| Byte | Bit position | Permission item | Bit value |
|---|---|---|---|
| 1 | 0 | Safety Report | 0 : certificate not allowed to sign<br>1 : certificate allowed to sign |
| 1 | 1 | Situation Report | 0 : certificate not allowed to sign<br>1 : certificate allowed to sign |
| 1 | 2 | Repeat of Safety Report | 0 : certificate not allowed to sign<br>1 : certificate allowed to sign |
| 1 | 3 | Prediction Information | 0 : certificate not allowed to sign<br>1 : certificate allowed to sign |

550

Fig. 5

COMMUNICATION WITHIN AN INTELLIGENT TRANSPORT SYSTEM

CROSS REFERENCE TO RELATED APPLICATIONS

This application claims the benefit under 35 U.S.C. § 119(a)-(d) of United Kingdom Patent Application No. 2200487.3, filed on Jan. 14, 2022, and of United Kingdom Patent Application No. 2209600.2, filed on Jun. 30, 2022, both entitled "Improved communication within an intelligent transport system". The above cited patent applications are incorporated herein by reference in their entirety.

FIELD OF THE DISCLOSURE

The present disclosure relates generally to Intelligent Transport Systems (ITS) and more specifically to Cooperative Intelligent Transport Systems (C-ITS).

BACKGROUND OF DISCLOSURE

Cooperative Intelligent Transport Systems (C-ITS) is an emerging technology for future transportation management that aims at improving road safety, traffic efficiency and driver experience.

Intelligent Transport Systems (ITS), as defined by the European Telecommunications Standards Institute (ETSI), include various types of communication such as:

- communications between vehicles (e.g., car-to-car), and
- communications between vehicles and fixed locations (e.g., car-to-infrastructure).

C-ITS are not restricted to road transport as such. More generally, C-ITS may be defined as the use of information and communication technologies (ICT) for rail, water and air transport, including navigation systems. Such various types of C-ITS generally rely on radio services for communication and use dedicated technologies.

Such C-ITS are subject to standards, specified for each country and/or territory where C-ITS are implemented. Today in Europe, the European Telecommunications Standards Institute is in charge of the elaboration of the specifications forming the standards to which C-ITS are subjected.

Cooperation within C-ITS is achieved by exchange of messages, referred as to ITS messages, among ITS stations (denoted ITS-Ss). The ITS-Ss may be vehicles, Road Side Units (RSUs), Vulnerable Road Users (VRUs) carrying an ITS equipment (for instance included in a smartphone, a GPS, a smart watch, or in a cyclist equipment), or any other entities or infrastructures equipped with an ITS equipment, as well as central subsystems (back-end systems and traffic management centers).

C-ITS may support various types of communications, for instance between vehicles (vehicle-to-vehicle or "V2V"), referring to all kinds of road users, e.g. car-to-car, or between vehicles and fixed locations such as vehicle-to-infrastructure or "V2I", and infrastructure-to-vehicle or "12V", e.g., car-to-infrastructure.

Such message exchanges may be performed via a wireless network, referred to as "V2X" (for "vehicle" to any kind of devices) networks, examples of which may include 3GPP LTE-Advanced Pro, 3GPP 5G, or IEEE 802.11p technology (3GPP, LTE, and IEEE are Registered Trade Marks).

Exemplary ITS messages include Collective Perception Messages (CPMs), Cooperative Awareness Messages (CAMs), and Decentralized Environmental Notification Messages (DENMs). The ITS-S sending an ITS message is named "originating" ITS-S and the ITS-S receiving an ITS message is named "receiving" ITS-S.

ETSI TS 103 324 (V0.0.22 of May 2021) defines the Collective Perception Service through which an ITS-S having on-board sensor systems detects objects in its vicinity and transmits, using broadcast CPMs, description information (e.g. dynamics such as position and/or kinematic information) thereof. The CPMs are sent periodically with a period from 100 ms to 1 s depending for example on the speed of the objects sensed by the originating ITS-S.

EN 302 637-2 (V1.4.1 of April 2019) defines the Cooperative Awareness Basic Service through which an ITS-S transmits, using broadcast CAMs, its ego-vehicle dynamics (e.g. position and speed).

EN 302 637-3 (V1.3.1 of April 2019) defines the Decentralized Environmental Notification Basic Service through which an originating ITS-S can send, using broadcast DENMs, notifications to other ITS-Ss, such as warnings or alerts. Such a message notifies an event (e.g. road hazard, driving environment, traffic condition) detected by the originating ITS-S.

An example of a DENM is an alert about a collision risk in a specific area. In such a case, the vehicles can trigger various emergency procedures or functions (e.g. automatic emergency braking, forward collision warning, etc.).

As mentioned above, the Collective Perception Service allows an ITS station to share on a periodic basis its perceived objects (e.g. vehicles or pedestrians) with other nearby ITS stations to improve their local environment perception. However, since the current CPM generation rule is dependent on the object kinematics (the period varying from 100 ms to 1 s), this may generate latency that may be problematic for critical safety situations. In addition, many objects are generally reported in dense areas, which increases the time needed to analyze the situation at the receiver side.

When the aim of DENMs is to alert the traffic participants about a possible risk, the Decentralized Environmental Notification Service triggers event-related information for various types of situation such as a collision risk, weather conditions, or human presence on the road, without precise and accurate information about which object is really concerned by the event.

Accordingly, while CPMs and DENMs have proven to be efficient, there is a continuous need for improvement in order to optimize the use of the bandwidth that is available for transmitting CPMs and DENMs and to provide right information at the right time to make it possible for an ITS-S to make the right decision at the right time.

SUMMARY OF THE INVENTION

The present invention has been devised to address one or more of the foregoing concerns.

According to a first aspect of the disclosure, there is provided a method of communication in an Intelligent Transport System, ITS, comprising, at an originating ITS station, ITS-S:

- in response to detecting at least one situation involving at least one object detected within an area monitored by the ITS, generating and transmitting a Collective Perception Message, CPM, wherein the generated CPM comprises a reference to the at least one object and an indication to indicate that the at least one object is involved in the at least one situation.

It is noted that the at least one situation may involve two or more objects detected within the area monitored by the ITS, the generated CPM comprising a reference to each of the two or more objects and an indication to indicate that the two or more objects are involved in the at least one situation.

Accordingly, objects concerned by safety-critical situations may be identified in CPMs and their inclusion in CPMs may be made with lower latency than not safety-critical objects. As a consequence, identification of the objects that are relevant for a given situation (that could have first been signaled by a DENM), by the ITS stations receiving the CPMs, is easier and faster. Therefore, the situation awareness of all receiving ITS stations is improved by reporting the objects that are associated with the same situation in a CPM, it being noted that this item of information makes it possible to speed up the analysis of the situation by the ITS receiving stations.

In addition, identifying safety-critical relevant objects in CPMs improves safety since the latency of the CPM generation may be reduced.

Some embodiments of the present disclosure are particularly advantageous when implemented in roadside units that might have more powerful situation analysis than vehicles (e.g. wider field of view, multiple fields of view, access to other information such as traffic conditions, traffic light status, etc.).

Accordingly, receiving ITS stations may obtain in priority information related to safety-critical objects and situations and can re-use results of analysis already done by the transmission side (in the case of a message sent by a roadside unit, that have more powerful analysis tools, the receiving ITS station may benefit from this analysis).

According to some embodiments, the generated CPM comprises at least one perceived object container, the at least one perceived object container comprising a description of the at least one object. Still according to some embodiments, the at least one perceived object container comprises a reference to the at least one situation.

According to some embodiments, the generated CPM comprises a space addendum container, different from the at least one perceived object container, the space addendum container comprising a reference to the at least one situation. Still according to some embodiments, the space addendum container further comprises a reference to the at least one object.

According to some embodiments, the at least one perceived object container further comprises an object safety level representing a risk level of the corresponding object with regard to the at least one situation. The method may further comprise selecting objects involved in the at least one situation, as a function of the object safety level, only selected objects being referenced within the generated CPM. Still according to some embodiments, all the selected objects may be referenced within the generated CPM.

According to some embodiments, the generated CPM further comprises a situation safety level representing a risk level of the at least one situation. Still according to some embodiments, the method further comprises determining whether the situation safety level is higher than a situation safety threshold and, in response to determining that the situation safety level is higher than the situation safety threshold, decreasing the minimum time elapsing between two consecutive CPM generation events.

According to some embodiments, the method further comprises disabling any mechanism preventing a same object to be referenced in consecutive CPMs and/or disabling any grouping mechanism, depending on an object safety level and/or a situation safety level.

Still according to some embodiments, the method further comprises obtaining an identifier of the at least one situation, wherein the generated CPM further comprises the identifier of the at least one situation, the identifier being a situation identifier of a Decentralized Environmental Notification Message, DENM, the DENM comprising information regarding the at least one situation.

Still according to some embodiment, the indication to indicate that the at least one object is involved in the at least one situation further comprises a reference to at least one second object, the at least one second object being different from the at least one object and being involved in the at least one situation.

Still according to some embodiment, the generated CPM further comprises predicted data associated with the at least one object and predicted data associated with the at least one second object.

Still according to some embodiment, the generated CPM comprises an item of information to indicate that the predicted data associated with the at least one object are linked to the predicted data associated with the at least one second object.

According to a second aspect of the disclosure, there is provided a method of communication in an Intelligent Transport System, ITS, comprising, at an originating ITS station, ITS-S:

in response to detecting at least one situation involving at least two objects detected within an area monitored by the ITS, generating and transmitting a Collective Perception Message, CPM, wherein the generated CPM comprises a reference to the at least two objects and a grouping information linking the at least two objects for the at least one situation.

Accordingly, objects concerned by safety-critical situations may be identified in CPMs and their inclusion in CPMs may be made with lower latency than not safety-critical objects. As a consequence, identification of the objects that are relevant for a given situation (that could have first been signaled by a DENM), by the ITS stations receiving the CPMs, is easier and faster. Therefore, the situation awareness of all receiving ITS stations is improved by reporting the objects that are associated with the same situation in a CPM, it being noted that this item of information makes it possible to speed up the analysis of the situation by the ITS receiving stations.

According to some embodiments, the grouping information associates a predicted path of one of the at least two objects with a predicted path of another one of the at least two objects, reflecting possible interactions between object predictions.

Still according to some embodiments, the method further comprises generating an identifier of the at least one situation, wherein the generated CPM further comprises the generated identifier, the generated identifier being independent from any situation identifier of Decentralized Environmental Notification Messages, DENM.

Still according to some embodiments, the method further comprises obtaining information regarding the at least one situation, the generated CPM further comprising the obtained information regarding the at least one situation. The obtained information regarding the at least one situation may be stored within a situation addendum container.

Still according to some embodiments, the method further comprises receiving a Decentralized Environmental Notification Message, DENM, the received DENM comprising the indication to indicate that the at least one object is involved in the at least one situation, or further comprises determining the indication to indicate that the at least one object is involved in the at least one situation.

According to some embodiments, the generated CPM further comprises a certificate of the originating ITS-S granted by a certification authority, the certificate including a permission to provide an indication that the at least two objects are involved in the at least one situation.

According to a third aspect of the disclosure, there is provided a method of communication in an Intelligent Transport System, ITS, comprising, at a receiving ITS station, ITS-S:

receiving a Collective Perception Message, CPM, analysing the received CPM and determining, from the received CPM, that at least one object detected within an area monitored by the ITS is involved in at least one situation.

This aspect of the disclosure has advantages similar to those mentioned above.

According to some embodiments, the method further comprises determining a predicted behavior of at least one second object from a predicted behavior of the at least one object, the at least one second object being different from the at least one object and the predicted behaviors and a link between the predicted behaviors being received within the received CPM.

According to a fourth aspect of the disclosure, there is provided an Intelligent Transport System, ITS, station, ITS-S comprising at least one microprocessor configured for carrying out each step of the method described above.

This aspect of the disclosure has advantages similar to those mentioned above.

According to a fifth aspect of the disclosure, there is provided a Collective Perception Message, CPM, to transmit information in an Intelligent Transport System, ITS, comprising a reference to at least one object detected within an area monitored by the ITS and comprising an indication to indicate that the at least one object is involved in a detected situation.

This aspect of the disclosure has advantages similar to those mentioned above.

According to a sixth aspect of the disclosure, there is provided a Collective Perception Message, CPM, to transmit information in an Intelligent Transport System, ITS, comprising a reference to at least one first and one second objects detected within an area monitored by the ITS and comprising an indication to indicate that a predicted behavior of the at least one second object may result from a predicted behavior of the at least one first object.

This aspect of the disclosure has advantages similar to those mentioned above.

According to a seventh aspect of the disclosure, there is provided a Collective Perception Message, CPM, to transmit information in an Intelligent Transport System, ITS, comprising a reference to at least two objects involved in at least one situation and a grouping information linking the at least two objects.

This aspect of the disclosure has advantages similar to those mentioned above.

According to an eight aspect of the disclosure, there is provided a non-transitory computer-readable medium storing a program which, when executed by a microprocessor or computer system in an Intelligent Transport System station, ITS-S, causes the ITS-S to perform each step of the method described above.

This aspect of the disclosure has advantages similar to those mentioned above.

At least parts of the methods according to the disclosure may be computer implemented. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present disclosure may take the form of a computer program product embodied in any tangible medium of expression having computer usable program code embodied in the medium.

Since the solutions of the present disclosure can be implemented in software, the solutions of the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings, in which:

FIG. 5 illustrates an example of a service specific permission (SSP) item which may be specified in a certificate of a CPM according to some embodiments of the present disclosure;

DETAILED DESCRIPTION OF THE DISCLOSURE

It is noted that the names of the lists and elements (such as data elements) provided in the following description are only illustrative. Embodiments are not limited thereto and other names could be used.

The embodiments of the present disclosure are intended to be implemented in Intelligent Transportation Systems (ITS).

According to some embodiments of the present disclosure, a CPM, i.e. a message regularly transmitted by an originating ITS station to share objects and free spaces perceived by its local sensors, comprises additional items of information about a situation concerning the perceived objects. Examples of such situations can be a human presence on the road, a collision risk, a pre-crash situation, traffic jamming, road work, etc. Accordingly, a link between perceived objects and a situation is provided in the CPM to associate these perceived objects with this situation. Several perceived objects may be associated with different situations.

In addition, the originating ITS station, ITS-S, sending such a CPM can identify whether some of the objects are safety-critical, based on the severity of the situation associated with them, and then may include in priority these objects at the next CPM generation event. Furthermore, a safety level (or safety-critical level) may be associated with some or all of the perceived objects associated with a situation.

Still according to some embodiments of the present disclosure, such a CPM comprising additional items of information to associate perceived objects with situations may reference one or more DENMs and/or may comprise further items of information to describe the one or more situations with which the perceived objects are associated.

On the other side, the receiving ITS-S, concerned directly or indirectly by a situation, can obtain additional (compared to known technics) information from the CPM combining objects and situation information. It can then perform a quicker analysis of the situation and then decide earlier to activate the mitigation actions appropriate to the situation (e.g. anti-collision or pre-crash functions, changing of an itinerary, etc.).

ITS System and ITS Station Comprising a Situation Analysis Module

Figure 1:
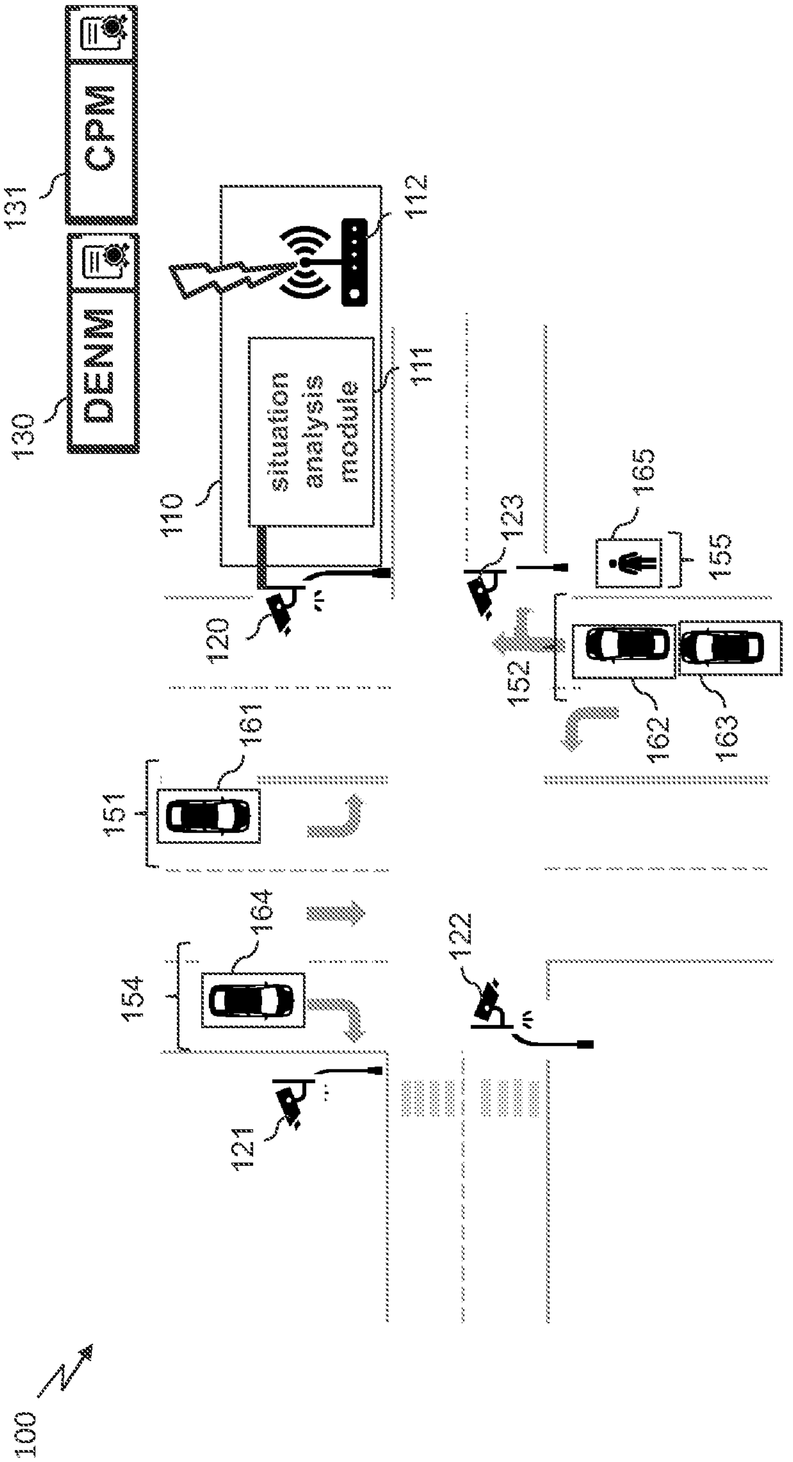
FIG. 1 illustrates an example of an ITS system in which some embodiments of the present disclosure may be implemented.

FIG. 1 illustrates an example of an ITS system in which some embodiments of the present disclosure may be implemented.

According to this example, an ITS station, that may generate and transmit DENMs and CPMs such as DENM 130 and CPM 131, is embedded in a road-side unit, RSU, 110. It is observed that RSUs have generally more powerful resources to analyze a collision risk situation than moving vehicles. For example, an RSU may have a wider field of view than an ITS-S embedded within a vehicle, multiple fields of view, fast access to other information such as traffic conditions, traffic light status, knowledge of objects that populate the monitored area, etc.

In particular, a wide view of the area monitored by an RSU allows the RSU to detect collisions or risks of collision mixing colliding vehicles that are ITS connected and not connected, and/or when colliding vehicles cannot see each other (e.g. due to an occlusion at an intersection).

As illustrated, ITS 100 is implemented at an intersection and comprises fixed road side unit 110 and several entities that may carry or embed an ITS station (ITS-S) each, for transmitting and/or receiving ITS messages within the ITS. The several entities may be for example, vehicles 151, 152, 153, and 154 and pedestrian 155.

Fixed road side unit 110 includes a set of sensors, such as image sensors, here video cameras 120, 121, 122, and 123 and an analytical module to analyze data provided by the sensors, such as situation analysis module 111. Each of the video cameras 120, 121, 122, and 123 is configured to monitor or scan a portion of the area monitored by the RSU (here the road intersection), making it possible to reproduce images of the monitored area. Other sensors such as LIDARs (laser imaging detection and ranging devices) may also be used.

The sensors are connected to the situation analysis module (e.g. video cameras 120, 121, 122, 123 are connected to situation analysis module 111) so that the situation analysis module processes the stream captured by the sensors/video cameras to analyze the situation. The situation analysis module and the sensors may be separate from or embedded within the same physical road side unit. For example, the situation analysis module may be wire-connected to sensors that may be remote (i.e. not embedded in the road side unit).

The processing of the data received from the sensors by the situation analysis module, e.g. situation analysis module 111, aims at detecting objects potentially present in the monitored area, referred to as "perceived objects" or "detected objects" hereinafter. Mechanisms to detect such objects are well known by one skilled in the art.

The situation analysis module is also configured to output a list of the perceived objects respectively associated with corresponding description information referred to as "state vector". The state vector for a perceived object may include for instance parameters such as a position, a kinematic, temporal information, behavioral or object type classification information, etc.

Therefore, the situation analysis module may identify, among the perceived objects, Vulnerable Road Users (VRUs) such as pedestrians, cyclists as well as motorcyclists and also persons with disabilities or reduced mobility and orientation. It may also identify objects such as trees, road construction/work equipment (e.g. road barriers), and so on.

The VRUs may be considered as ITS-S when carrying an ITS equipment, for example an ITS equipment included in a smartphone, a satnav system, a smart watch, or in a cyclist equipment.

According to the example illustrated in FIG. 1, situation analysis module 111 may perceive the following objects when scanning the monitored area:

- objects 161, 162, 163, and 164 respectively corresponding to vehicles 151, 152, 153, and 154 on the roadway and
- object 165 corresponding to pedestrian 155 on the sidewalk.

In addition, the perceived objects may be classified. For example, if the perceived objects are ITS stations, they can be classified as vehicles, VRUs, RSUs, or any another ITS-S types. Such object type classification may be based for example on predetermined rules, provided during the setting up of road side unit 110, or more generally the ITS-S. ETSI TR 103 562 V2.1.1 defines for instance the categories “unknown”, “vehicle”, “person”, “animal”, and “other”. Of course, other categories, more specific, can be defined.

According to some embodiments of the present disclosure, the situation analysis module comprises situation analysis functions to analyze the trajectories of the perceived objects, to predict their future trajectories, and to identify possible risks of collision between perceived objects.

The situation analysis module may also have access to some information about the monitored area, e.g. about the road intersection geometry, that can be used to analyze the monitored area, enabling, for example, to detect the presence of a pedestrian on the roadway outside of the crosswalk area.

As illustrated in FIG. 1, road side unit 110 further comprises a Roadside ITS-S, R-ITS-S, 112, for example as specified in the reference architecture of an ITS station defined in version V1.1.1 of the ETSI EN 302 665 specification.

Figure 4:
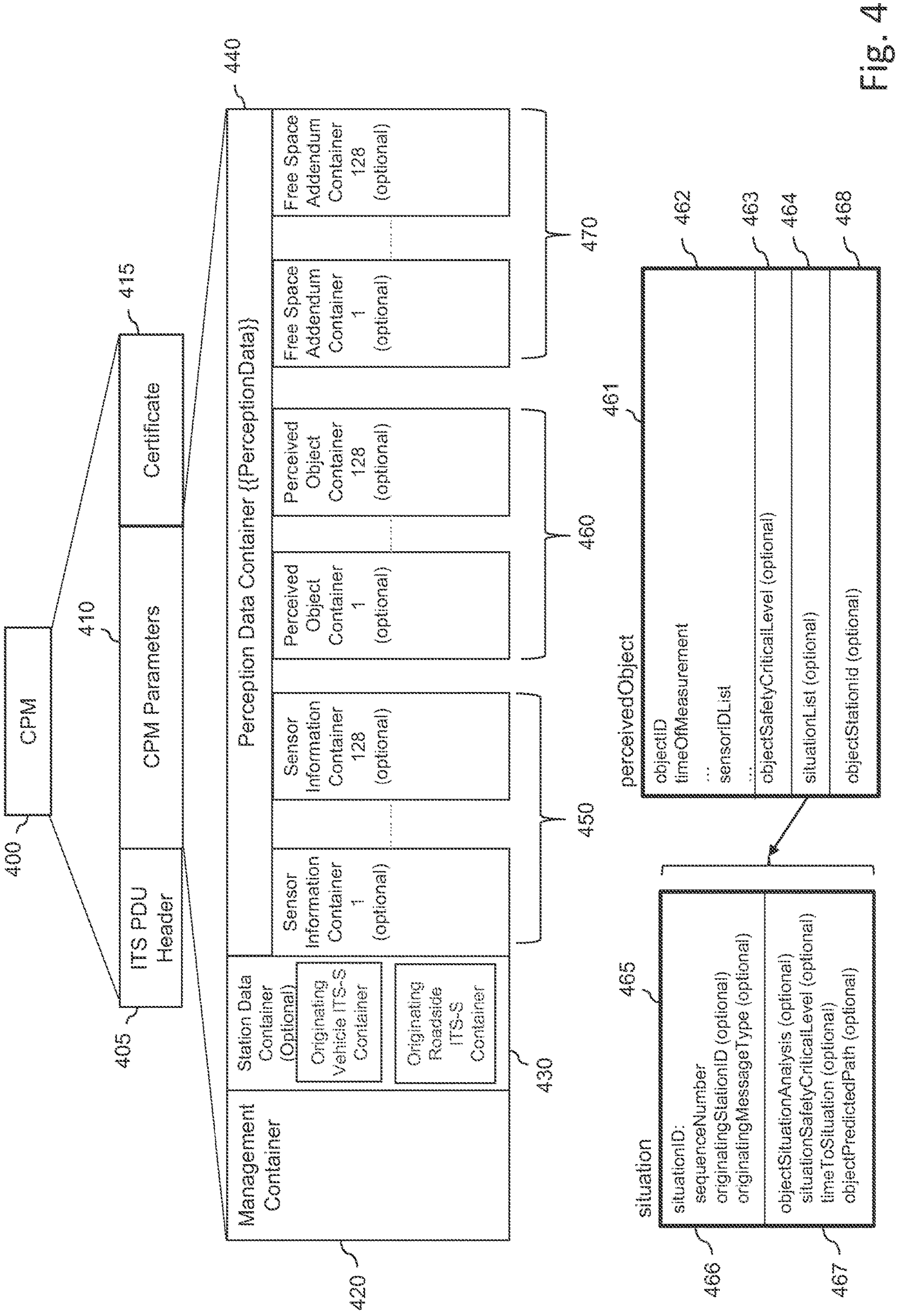
FIG. 4 illustrates an example of a structure of a collective perception message, CPM, according to some embodiments of the present disclosure.
Figure 6:
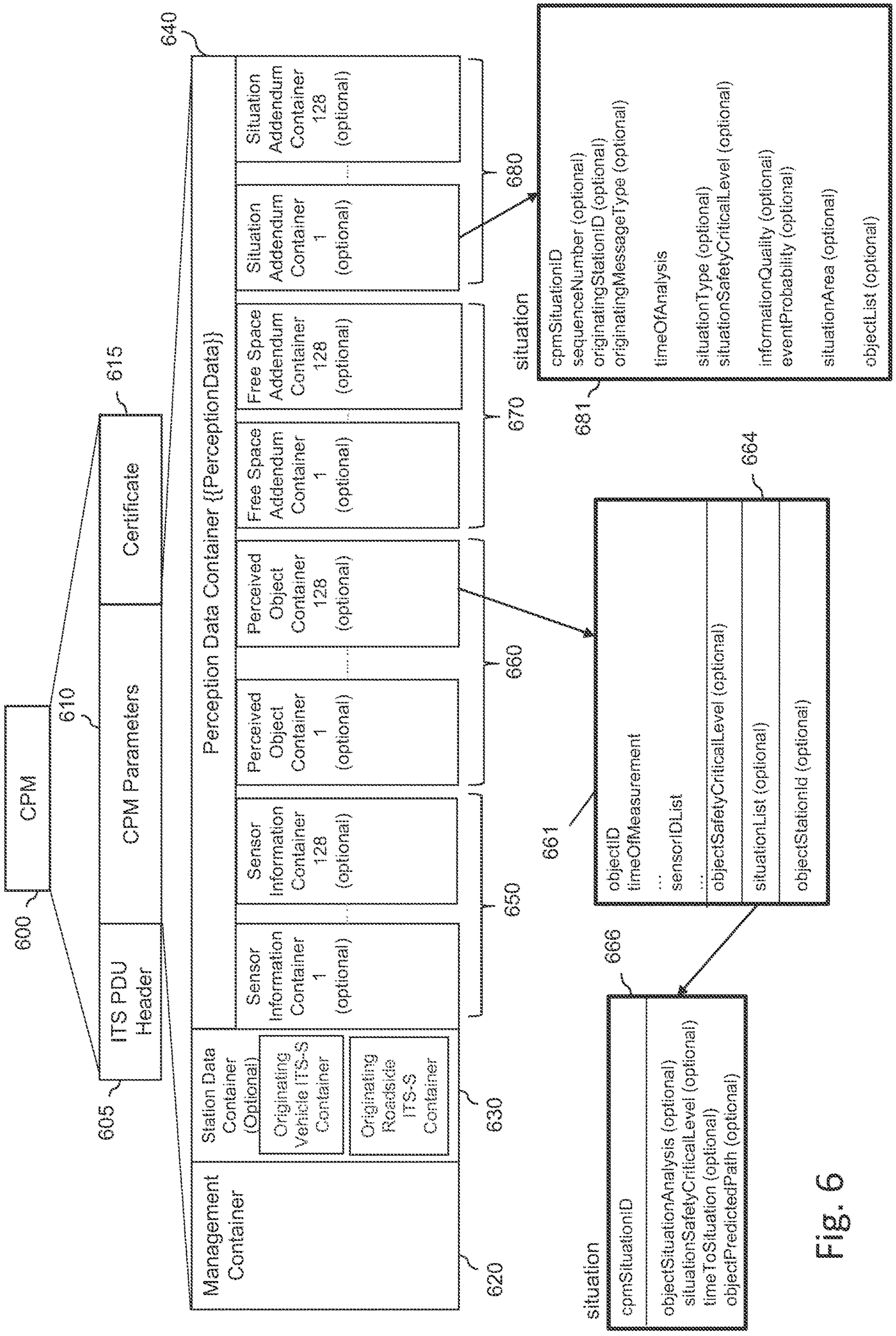
FIG. 6 illustrates an example of a structure of a collective perception message, CPM, extended with a situation addendum container according to some embodiments of the present disclosure.
Figure 7:
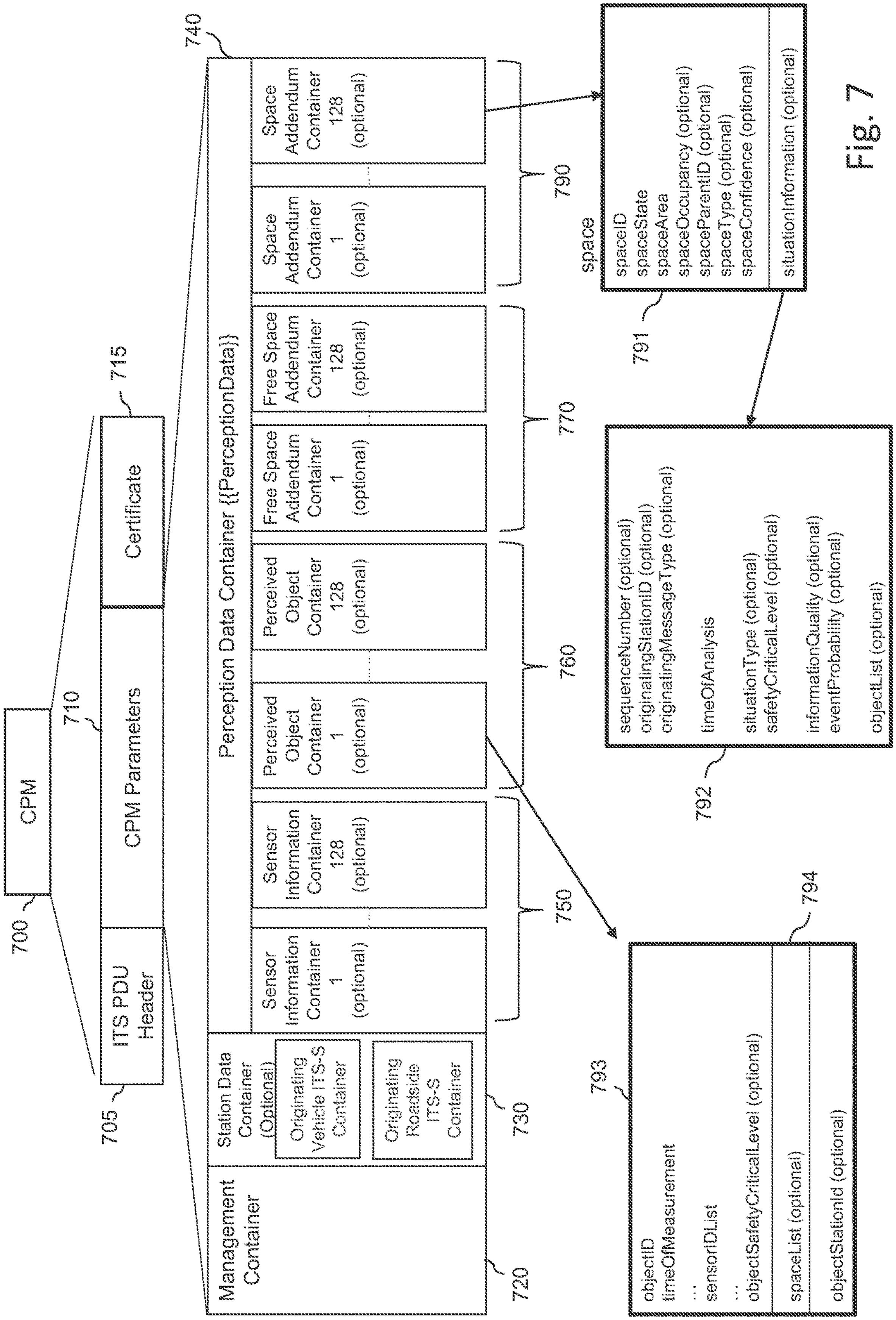
FIG. 7 illustrates an example of a structure of a collective perception message, CPM, extended with a Space Addendum container according to some embodiments of the present disclosure.

By the means of roadside ITS-S 112, RSU 110 can share information relative to the perceived objects. Typically, RSU 110 can share such information with receiving ITS stations by sending ITS messages, particularly the so-called Collective Perception Messages, CPMs, e.g. CPM 131, defined in documents ETSI TR 103 562 and ETSI TS 103 324 and usually sent periodically. Examples of formats of a CPM according to some embodiments of the present disclosure are illustrated in FIGS. 4, 6, and 7.

By the means of roadside ITS-S 112, RSU 110 can also share information relative to a detected event. Typically, RSU 110 can share such triggered-event information with receiving ITS stations by sending ITS messages, particularly the so-called Decentralized Environmental Notification Messages, DENMs, e.g. DENM 130, defined in document EN 302 167-3.

More generally, any ITS-S in ITS 100 can share information on the objects it perceives, by sending CPMs, as well as information on itself, by sending so-called Cooperative Awareness Messages, CAMs, defined in document ETSI EN 302 637-2. CAMs may include a position, a kinematic (or dynamics), a unique station identifier, temporal information, behavioral or object type classification information, etc. Similarly, VRU Awareness Messages, VAMs, defined in document ETSI TS 103 300-3, can be sent by VRU ITS-S to share their own position and kinematic or the sharing of the information corresponding to a group of VRUs (VRU cluster).

The ITS messages are usually broadcast by their originating ITS-S, so that any other ITS-S can exploit them.

All the messages exchanged over ITS 100 help each ITS-S to have a good level of knowledge of its environment in terms of which objects are present, where and how they behave.

Figure 2:
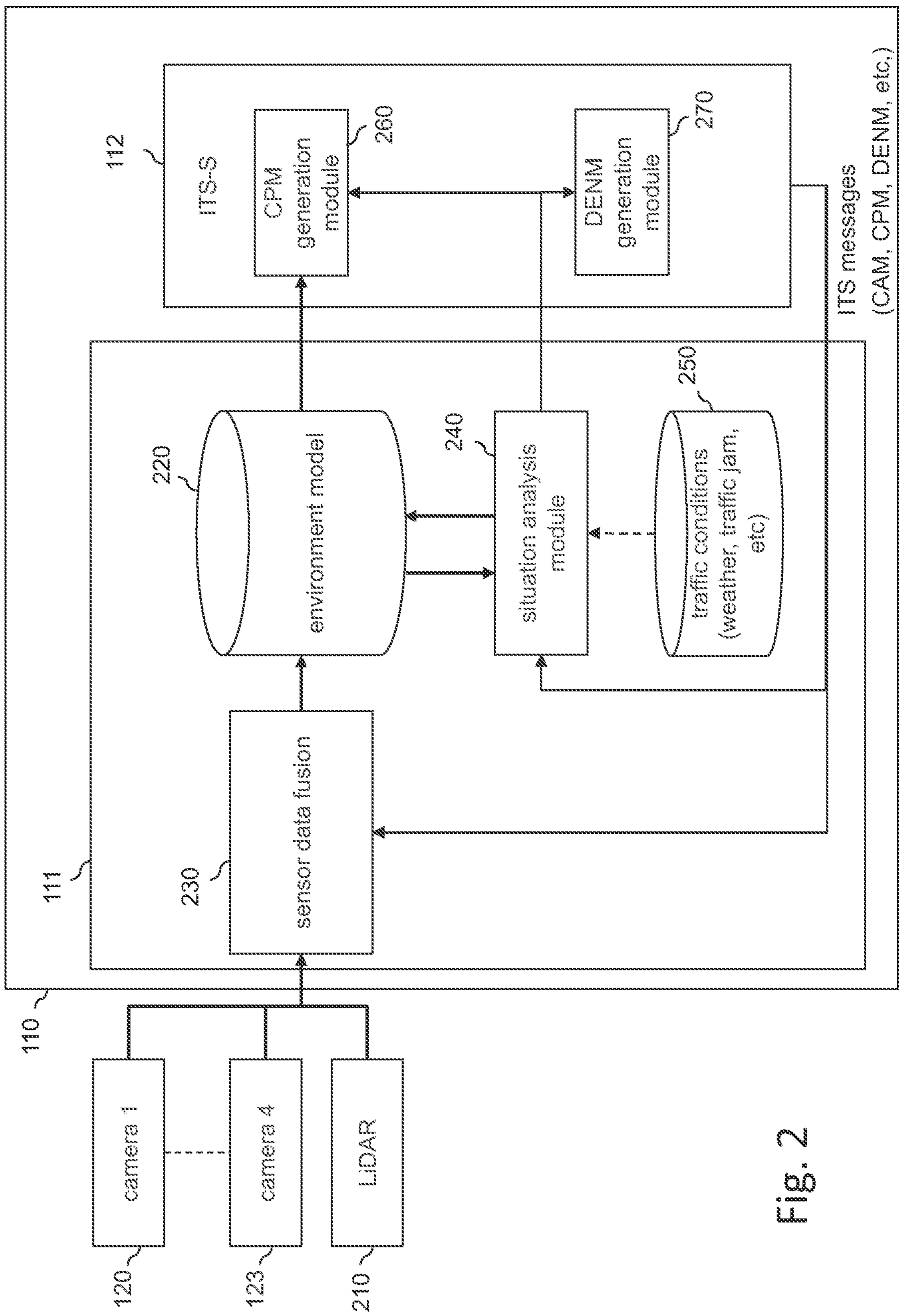
FIG. 2 illustrates an example of an ITS station in which some embodiments of the present disclosure may be implemented.

FIG. 2 illustrates an example of an ITS station in which some embodiments of the present disclosure may be implemented.

For the sake of illustration, it is considered here that the illustrated ITS station is the RSU referenced 110 in FIG. 1. However, it may be another type of ITS-S-equipped entity.

As mentioned above by reference to FIG. 1, situation analytic module 111 is connected to one or more sensors monitoring an area such as a road intersection. These sensors may include cameras 120-123 but also other sensors such as LIDAR 210 or mere radar devices.

The perceived objects detected by each sensor are analyzed by sensor data fusion module 230 in order to combine or merge the same objects detected by several sensors. Consideration of similarity between objects from different sensors can be based on their object types, positions, kinetics/dynamics (speed, acceleration), trajectories, etc. A level of confidence may also be computed when scrutinizing the similarities of these information items and the merging can be affected when the level of confidence is high enough.

Newly perceived objects or updates about already-tracked objects are used to update the environment model 220 of the ITS-S. Received CAMs, VAMs, DENMs, and CPMs from other ITS-S, conveying additional information, can also be used to update environment model 220.

The environment model is also known as the Local Dynamic Map and contains a list of the perceived objects. Each ITS-S has its own environment model 220.

An object in environment model 220 is defined together with multiple information items including, for example, all or part of the following:

- objectID: is the identifier of the perceived (or detected) object,
- timeOfMeasurement: represents the time when the (last) measurement concerning the perceived object was made,
- Distance: is the distance between the perceived object and the originating ITS-S. It is determined according to a frame of reference fixed to the originating ITS-S (e.g. RSU 110 in FIG. 1). For example, the distance is determined relatively to three directions x, y, z of the frame of reference, such that the distance is indicated within three fields xDistance, yDistance, zDistance, which represent together the distance between the perceived object and the originating ITS station’s reference point at the time of measurement, with a corresponding level of confidence,
- Speed: is the speed of the perceived object with respect to the originating ITS station’s reference point at the time of measurement. For example, the speed is determined relatively to three directions x, y, z of the frame of reference such that the speed is indicated within three fields xSpeed, ySpeed, zSpeed, representing together the speed of the detected object, with a corresponding level of confidence,
- Acceleration (optional): is the acceleration of the perceived object with respect to the originating ITS station’s reference point at the time of measurement. For example, similarly to the speed, the acceleration is indicated within three fields xAcceleration, yAcceleration, zAcceleration relatively to the three directions of the frame of reference fixed to the originating ITS-S, with a corresponding level of confidence, planarObjectDimension (optional): represents the dimensions of the perceived object. The dimension may be indicated within three fields planarObjectDimension1, planarObjectDimension2, verticalObjectDimension, objectRefPoint: is the reference point of the perceived object. By default, the reference point is the center point of the perceived object, objectAge: is the age of the perceived object, objectConfidence: represents a confidence level associated with the perceived object. The computation of the object confidence level is based on a sensor's or merging system confidence, the binary detection success (i.e. the detection success of the object during the last measurements), and the object age, classification (optional): provides the classification of the perceived object, with a corresponding level of confidence, sensorIDList (optional): is a list of the sensors of the perceived object, dynamicStatus (optional): provides the capability of the originating ITS-S to move away from the perceived object (e.g. dynamic, hasBeenDynamic, static), matchedPosition, (optional): indicates the position of the perceived object mapped onto the intersection topology description transmitted in MAP messages, situationList (optional): is a list of situations that are associated with the perceived objects. The mapping of a perceived object with a situation is obtained from the situation analysis module (e.g. from situation analysis module 240), safetyCriticalLevel (optional): represents the safety-critical levels of the perceived objects. The safety-critical level may be computed by the situation analysis module (e.g. situation analysis module 240). There is a safety-critical level for each situation (it being noted that an object can belong to multiple situations at the same time). A global objectSafetyCriticalLevel can be computed when there are multiple situations based on the situationSafetyCriticalLevel computed for each object/situation association. In a variant, an object can also have its safety-critical level set using objectSafetyCriticalLevel independently of the detected situations (e.g. a car on a cyclist lane), objectPredictedPath (optional): represents a predicted path of the perceived object. It may be determined by the situation analysis module. This predicted path is in the context of a situation as several possible paths can be predicted for the same object, timeToSituation (optional): this value represents the relevance of the perceived object for a situation with which is associated the perceived object. A 0-value means that the perceived object is directly concerned by the situation. This value may be expressed in seconds and may be computed by the situation analysis module based on the distance and the speed of the perceived object from the situation, objectStationID (optional): is an ITS-S identifier associated with the perceived object, with a corresponding level of confidence. The confidence level can be computed based on the accuracy of a position contained in a received CAM, a received VAM, or a received DENM (comprising an ITS ID) and the position measured by the local sensors, and predictions (optional): contains additional information linked to the future state of an object, such as a list of predicted paths and their probability.

According to some embodiments of the present disclosure, the environment model contains a situation list regularly updated by the situation analysis module.

For example, a CPM sent by an originating ITS-S wishing to share perceived object information includes containers (Perceived Object Containers), each listing such information for the corresponding perceived object.

Figure 3A:
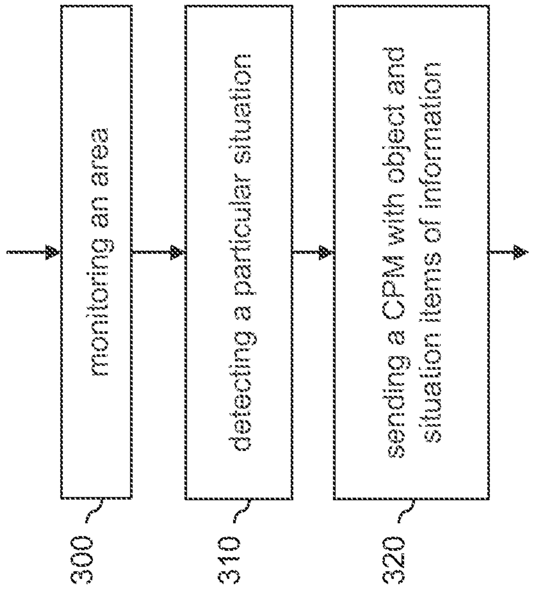
FIGS. 3*a* and 3*b* illustrate, using flowcharts, examples of general steps of methods according to embodiments of the present disclosure, respectively at an originating ITS-S sending a CPM containing perceived objects associated with a given situation and a corresponding receiving ITS-S.
Figure 3B:
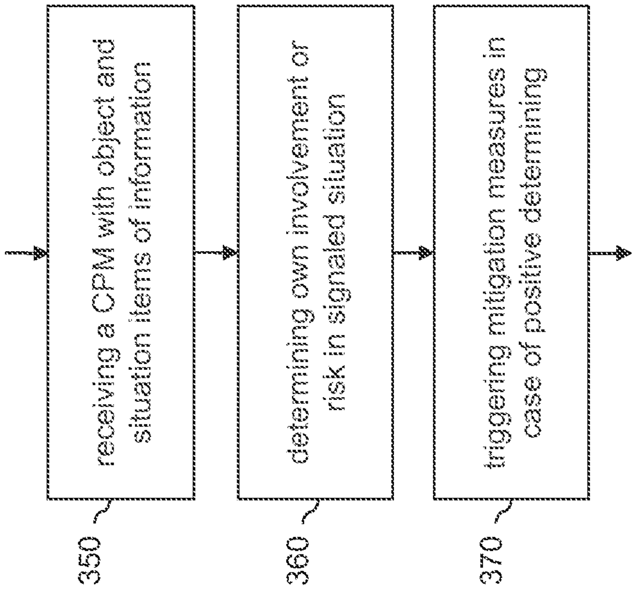

FIGS. 3*a* and 3*b* illustrate, using flowcharts, examples of general steps of methods according to embodiments of the present disclosure respectively at an originating ITS-S sending a CPM containing perceived objects associated with a given situation and corresponding receiving ITS-S.

As shown in FIG. 3*a*, a method of communication in an ITS according to some embodiments of the present disclosure comprises, at the originating ITS-S, e.g. RSU 110 of FIG. 1, a step of monitoring an area such as a road portion or a road intersection as shown in FIG. 1 (step 300). To that end, the originating ITS-S uses its sensors (e.g. sensors 120-123 and 210 in FIG. 2) and its sensor data fusion module (e.g. sensor data fusion module 230 in FIG. 2) to update its environment model (e.g. environment model 220 in FIG. 2) with information directed to perceived objects. It can also update its environment model using ITS messages (CAMs, VAMs, CPMs, or DENMs) received from other ITS-Ss. In particular, received DENMs may be addressed to the situation analysis module (e.g. situation analysis module 240 in FIG. 2) to update the environment model.

The situation analysis module continuously analyzes the objects of the environment model and the DENMs received from other ITS-Ss so as to detect whether a particular situation is occurring (step 310). This may include analyzing the position of objects on road portions (e.g. detecting human presence on a road), predicting trajectories for the perceived objects, and inferring whether a risk exists, for example a risk of collision between several objects, or even whether a pre-crash situation exists if the predicted time to collision is less than a predetermined threshold, for example 1.5 s.

In a case in which a particular situation is detected, the originating ITS-S sends a CPM containing an item of information about the perceived objects and the associated situations (step 320), for example using the CPM format illustrated in FIG. 4.

As illustrated in FIG. 3*b*, after receiving a CPM comprising items of information associating objects with situations (step 350), a receiving ITS-S, that can be for example a vehicle or a pedestrian, may use the received CPM to update its local dynamic map. The receiving ITS-S can also use the CPM to determine whether it is concerned by the considered situation (step 360), and in particular if it is concerned by a safety-critical situation. It can also check whether there are some safety-critical objects or a dangerous situation near itself. This may be done by checking whether the description of an object (e.g. as defined in perceived object containers 460 in FIG. 4) matches its own description (e.g. in terms of position, speed, and dimensions). In a variant, this may be done by checking the objectStationID added in the Perceived Object Container when this information is available, as described by reference to FIG. 4.

In a variant, this may be done by checking whether one of the safety-critical objects as defined in the Perceived Object Containers is too close (in terms of position, speed and dimensions) to itself, to determine an own risk associated with a situation.

In case of positive determining, the receiving ITS-S can then trigger the appropriate mitigation measures (step 370), depending on the situation type, such as pre-crash functions, changing of the itinerary, emergency brake, etc.

CPM Structure

According to the disclosure, the structure of the CPMs is modified to comprise items of information describing a link between perceived objects and one or more situations.

FIG. 4 illustrates an example of a structure of a collective perception message, CPM, according to some embodiments of the present disclosure.

The illustrated CPM structure, referenced 400, is based on ETSI TS 103 324 Specification (V0.0.22 of May 2021). It comprises an ITS PDU header referenced 405, a "CPM Parameters" field 410, and a "Certificate" 415.

ITS PDU header 405 is a common header that includes the information of the protocol version, the message type, and the ITS-S identifier (ID) of the originating ITS-S.

"CPM Parameters" field 410 contains a management container referenced 420, a station data container referenced 430, a perception data container referenced 440 containing a set of sensor information containers referenced 450, a set of perceived object containers referenced 460, and a set of free space addendum Containers referenced 470.

Each container includes some data elements (DE) and/or data frames (DF). ETSI TS 102 894-2 Specification defines conventional data elements and data frames used in ITS messages.

Regardless of the type of the ITS-S generating the considered CPM, the management container provides information regarding the station type and the reference position of the originating ITS station. The message can be transmitted either by an ITS station, such as a vehicle, or by a stationary RSU. In case of a CPM generated by a vehicle, the station data container contains the dynamic information of the originating ITS station. It is not optional in case of a vehicle transmitting the CPM. In case of a CPM generated by an RSU, the station data container may provide references to identification numbers provided by the MAP Message (CEN ISO/TS 19091) reported by the same RSU. These references are required in order to match data provided by the CPM to the geometry of an intersection or road segment as provided by the MAP message. It is not required that a RSU has to transmit a MAP message for matching objects to road geometries. In this case, the station data container may be omitted. It is for this reason that the station data container is set as optional.

Each sensor information container contained in the set of sensor information containers 450 is optional. It provides information about the sensory capabilities of an ITS station. Depending on the station type of the originating ITS station, different container specifications are available to encode the properties of a sensor. The sensor information containers are attached to CPMs at a lower frequency than the other containers, as defined in ETSI TR 103 562. Up to 128 containers of this type may be used in a CPM.

Each perceived object container contained in the set of perceived object containers 460 is optional. It is composed of a sequence of optional or mandatory data elements (DEs) and/or data frames (DFs) which give a detailed description of the dynamic state and properties of a detected (or perceived) object.

More precisely, each object has to be described using the dedicated perceivedObject structure referenced 461. The first part of this structure (reference 462) contains data elements and/or data frames as defined by the ETSI TS 103 324 (V0.0.22 of May 2021) and comprises various fields including the following:

objectID: this data element is an identifier assigned to a perceived object. It remains constant as long as the object is perceived by the originating ITS-S, timeOfMeasurement: this data element corresponds to the time difference for the provided measurement information with respect to the generation delta time stated in the management container, the distance defined by xDistance, yDistance, and zDistance (optional): it corresponds to the distance between the perceived object and the ITS-S's reference point the in x, y, z-direction of the ITS-S coordinate system, respectively, for the time of measurement, the speed defined by xSpeed, ySpeed and zSpeed (optional): it corresponds to the speed of the perceived object in the detecting ITS-S's reference system in the x, y, z-direction, respectively, for the time of measurement, the acceleration (optional) defined by xAcceleration, yAcceleration, and zAcceleration: it corresponds to the acceleration of the perceived object from the ITS-S's reference point in the x, y, z-direction, respectively, for the time of measurement, the dimension (optional) defined by planarObjectDimension1, planarObjectDimension2, and verticalObjectDimension: it represents the dimension of the perceived object, objectRefPoint: this is a reference point of the detected object. By default, the reference point is the center point of the perceived object, objectAge: it is the age of the perceived object, objectConfidence: it is the confidence level associated with the perceived object. The computation of the object confidence level may be based on a sensor's or merging system confidence, on the binary detection success (i.e. the detection success of the object during the last measurements), and on the object age, sensorIDList (optional): it is the list of sensor identifiers which provided the measurement data. It refers to sensorID in the sensor information container. If the sensor information container is never provided by the originating ITS-S, the list may be populated with random numbers, where each number is assigned to a sensor of the originating ITS-S, dynamicStatus (optional): it is a dynamic Status providing the capabilities of the originating ITS-S to move away from the perceived object (for example, it may take one of the values dynamic, hasBeenDynamic, or static), classification (optional): it provides the classification of the perceived object. It is composed of an object class and possibly a subclass (e.g. vehicle class has subclasses passengerCar, bus, etc.) with a class confidence value, and matchedPosition, (optional): it indicates the position of the perceived object mapped onto the intersection topology description transmitted in MAP messages.

Each free space addendum container contained in the set of free space addendum containers 470 is optional. It comprises a sequence of optional or mandatory data elements (DEs) which provide information about free spaces detected by a particular sensor. Each free space comprises various fields such as:

freeSpaceConfidence: is the free space confidence value that applies to the entire area, freeSpaceArea: is the geometry of the free space area, sensorIDList is a list of identifiers of the sensors which performed the measurement to indicate the free space, and shadowingApplies: is a Boolean indicator used to indicate whether a tracing approach should be used to compute a shadowed area behind an object.

It is noted that collective perception messages as described in TS 103 324 draft V0.0.22 with the items of information contained in data structure 462 for perceivedObject allows the reporting of a list of independent objects.

According to particular embodiments of the present disclosure, the situation awareness of all ITS-S receiving CPMs is improved by including information about a situation concerning objects reported in a CPM, making it possible to associate objects reported in a CPM with one or more particular situations. In addition, the safety may be improved by identifying objects that are safety-critical so that a situation analysis module (e.g. situation analysis module 240 in FIG. 2) can trigger a CPM generation event with a lower latency compared to prior art.

To that end, the CPMs that are generated and transmitted according to some embodiments of the present disclosure contain additional information to be included in the perceivedObject structure (e.g. perceivedObject structure 461). Such items of information may comprise:

objectSafetyCriticalLevel (e.g. data element 463): is a safety-critical level value assigned to the perceived object, situationList (e.g. data frame 464): is a list of situations, containing situation identifiers (e.g. situationID data frame 466) and information related to the object analysis in the context of the listed situations (e.g. objectSituationAnalysis data frame 467), and/or objectStationID (e.g. data frame 468): is an ITS-ID of the perceived object, with the confidence level in the association between the ITS-ID and the perceived object.

It is noted here that the situationList given per object, described in a CPM, makes it possible to establish a list of objects associated with the same situation. Alternatively, a list of objects may be provided per situation. For example, a LinkedObjectList may be a list of linked objects referred by their CPM objectID.

The corresponding ASN.1 representation of the data added in the perceived object container 461 may be expressed as follows:

```
PerceivedObject : := SEQUENCE {
    objectID                      Identifier,
. .
  /** @details objectSafetyCriticalLevel
    Safety-critical categorization of the perceived object
    @see SafetyCriticalLevel
    */
    objectSafetyCriticalLevel   SafetyCriticalLevel OPTIONAL,
. .
  /** @details situationList
    List of situations which provided the situation data.
    @see SituationList
    */
    situationList               SituationList OPTIONAL,
    /** @details objectStationId
    ITS ID of the detected object with the association confidence level
    @see ObjectStationId
    */
    objectStationID               OPTIONAL -- ITS ID of the object
with its confidence
. .
}
```

According to some embodiments, the safety-critical categorization information of data element 463 added in the perceived object container 461 is computed by a situation analysis module. This information can be in the form of level values (as illustrated in Table 1 in the Appendix, wherein the safety-critical level is a value, where 0-value means that the object is not detected as safety-critical and higher values means that the object is detected as safety-critical) or percentage values (as illustrated in Table 2 in the Appendix).

It is observed that an object can be associated with multiple situations at the same time. As described above, a list of situation identifiers (situationIDs) may be provided in the data frame situationList 464, a situation being composed, for example, of multiple items of information provided in the situation data frame 465.

As illustrated, a first part of the situation data frame 465, denoted situationID and referenced 466, contains information representing the situation such as an identifier. A second part of the situation data frame 465, denoted objectSituationAnalysis and reference 467, contains information representing the perceived object with respect to that situation.

Examples of a format of a list of situations (e.g. situationList data frame 464), of situations (e.g. situation data frame 465), of situation identifiers (e.g. situationID data frame 466), of information representing the object with respect to that situation (e.g. objectSituationAnalysis data frame 467), and of identifiers of stations having detected objects (e.g. objectStationID data frame 468) are provided in Tables 3 to 7, respectively, of the Appendix.

A situation identifier may be determined by a situation analysis module such as situation analysis module 240 in FIG. 2 when detecting a new situation. If a new situation is detected upon a DENM event (either received from another ITS-S or triggered by a local DENM generation module, e.g. local DENM generation module 270), then the situationID may re-use the DENM actionID composed of the ITS-ID of the originating station (originatingStationID) and of a sequence number (sequenceNumber). It is possible to indicate the type of message used to detect the situation (originatingMessageType). It can be the DENM type or the CPM type of CPMs containing situation and safety-critical level information as disclosed.

If there is no DENM associated with the new situation, then the situation analysis module may create a new situation identifier composed of the ITS-ID of the originating station and of a sequence number. This sequence number may be set to a next unused value each time a new situation is detected by the originating ITS-S.

Since an object can be associated with multiple situations, the items of information related to an object/situation association can be provided in a data frame such as data frame 467 (i.e. objectSituationAnalysis). It is possible to set a safety-critical level information that is relevant for a specific situation (e.g. situationSafetyCritical Level). In addition, a time-to-situation (e.g. timeToSituation) and a predicted path (e.g. objectPredictedPath) may be estimated based on the object relative distance and relative speed to the situation. When an object is directly concerned by the considered situation, the time-to-situation may then be set to 0. In a variant, the time-to-situation can be representing a time-to-collision value.

Thanks to the information about the situations associated with a perceived object, it is possible to link the objects concerned by the same situation together instead of having independent reporting of objects by the collective perception service.

Thanks to the safety-critical level, it would be possible to prioritize the perceived object candidates to be included at a next CPM generation event. For safety-critical situations, it is possible to have a low latency for the next CPM generation event, as described by reference to FIG. 9.

FIG. 5 illustrates an example of a Service Specific Permission (SSP) item which may be specified in a certificate of a CPM according to some embodiments of the present disclosure.

Back to FIG. 4, certificate 415 is attached to CPM 400 to certify the authenticity of the originating ITS-S (e.g. R-ITS-S 112 in FIG. 1) and its permission to provide ITS messages and some information they comprise. The permissions are defined in a so-called service specific permission (SSP) item within the certificate.

In order to secure V2X communications within the ITS, a public-key-infrastructure (PKI) as defined in the version 1.1.1 of the ETSI TS 102 731 specification may be used, in particular to control the integrity of a message and to authenticate an originating ITS-S. The PKI-based security may be implemented through the use of certificates delivered by a certification authority to the ITS stations.

Therefore, each ITS message exchanged is made of a non-encrypted message, CPM parameter 410, accompanied with a digital signature and a pseudonym certificate (also referred to as authorization ticket) that validates the authenticity of the originating ITS-S and the integrity of the message, while keeping anonymity of the originating ITS-S. For communicating within the ITS, an ITS-S may comprise one or more authorization tickets, and may use an authorization ticket for communicating.

Information about the safety-critical categorization of the different entities present in the monitored area, provided for example in the data element 463 of CPM 400 in FIG. 4, should preferably, for security reasons, come from a station considered as secure. Likewise, information about the situation association with the objects reported in CPM provided for example in data frame 464, should preferably, for security reasons, come from a station considered as secure.

The authorization ticket may therefore comprise indications related to the privileges and authorizations of an originating ITS-S to transmit specific ITS messages, for example CPM 400 comprising data element 463 or data frame 464.

To that end, an authorization ticket may contain a field called ITS AID, which includes the list of the services that the station is authorized to access and use, as specified in ETSI TR 102 965. In particular, a specific service is dedicated to collective perception service, to indicate that the sender is entitled to send CPMs. The authorization ticket also contains a field called ITS AID service specific permissions (SSP), which indicates specific sets of permissions within the overall permissions indicated by the ITS-AID. Its format is specified in ETSI TS 103 097.

According to some embodiments of the present disclosure, a SSP is provided, that may be specified in the certificate of CPMs containing a data element or a data frame like data element 463 or data frame 464, as described hereinbefore. An example of such a SSP is illustrated in FIG. 5.

As illustrated, SSP 500 comprises 3 bytes referenced 510, 520, and 530. According to this example, the first byte (byte 510) identifies an SSP version and the second and third bytes (bytes 520 and 530) specify specific permissions.

Still according to the illustrated example, specific permissions 540 are introduced using the first, second, and third bit of the second byte (byte 520) as follows:

- the first bit is set to 1 for indicating a permission for reporting a safety-critical categorization information item (such as data element 463) in the payload of the CPM, otherwise it is set to 0,
- the second bit is set to 1 for indicating a permission for reporting a situation information item (such as data frame 464) in the payload of the CPM, otherwise it is set to 0, and
- the third bit is set to 1 for indicating a permission for repeating a safety-categorization information item in the payload of the CPM, otherwise it is set to 0.

As described by reference to FIG. 14, an additional specific permission (referenced 550) may be set to authorize reporting of predicted information such as data element 1471 in FIG. 14. It is noted that the fourth bit of the second byte is not used in the case where no predicted data are transmitted within the CPMs.

Of course, other positions and/or values may be contemplated.

With this permission, the originating ITS-S is allowed to include in its CPM safety-critical objects perceived by other ITS-S and reported through their respective CPMs when these safety-critical objects are associated with a situation detected by the situation analysis module of the originating ITS-S.

According to some embodiments of the present disclosure, such an SSP may be provided in authorization tickets dedicated to an RSU, which are less likely to be hacked. Of course, according to some embodiments of the present disclosure, such an SSP may be provided within authorization tickets to any type of ITS-S.

FIG. 6 illustrates an example of a structure of a collective perception message, CPM, extended with a situation addendum container according to some embodiments of the present disclosure.

Like CPM 400 in FIG. 4, CPM 600 comprises an ITS PDU header referenced 605, a “CPM Parameters” field 610, and a “Certificate” 615. Similarly, “CPM Parameters” field 610 contains a management container referenced 620, a station data container referenced 630, a perception data container referenced 640 containing a set of sensor information containers referenced 650, a set of perceived object containers referenced 660, and a set of free space addendum containers referenced 670.

In addition, according to the illustrated embodiment, the perception data container 640 further comprises a set of situation addendum containers referenced 680.

The situation addendum containers contain information describing situations such as situation 681 with more details than a CPM having a CPM structure such as the one illustrated in FIG. 4.

This additional container could advantageously be used to include information that could also be contained in a separate DENM. This facilitates the analysis of the content of the CPM at the receiving ITS-S since it has the object list and the situation information at the same time.

According to the illustrated example, situation addendum container 681 comprises:

- cpmSituationID data frame: is an identifier of the situation. The cpmSituationID is preferably set to a next unused value each time a new situation or event is detected by the CPM originating ITS-S,
- like the situationID defined in reference to FIG. 4, this cpmSituationID can refer to a DENM ID. Accordingly, the following optional fields should be specified: sequenceNumber, originatingStationID, and originatingMessageType, using the same field definition as described with reference to fields 466, timeOfAnalysis data element: represents the time of analysis (similar to the time of measurement of a detected object). This data element corresponds to the time difference for the provided situation information with respect to the generation delta time stated in the management container of the CPM, situationType data frame (optional): represents the type of the situation. These types may be similar to the DENM event types and additional situation types could be defined such as tolling lane, parking entrance, etc., situationSafetyCriticalLevel data element (optional): it represents the severity of the situation, information Quality data element (optional): represents the quality of the information used to create the situation. For the sake of illustration, it may be an integer value comprised between 0 and 7, where: {unavailable (0), lowest(1), highest(7)} (0 . . . 7), eventProbability data element (optional): it represents the probability that the event will happen (e.g. for a collision risk situation), situationArea data frame (optional): represents the area of the situation (e.g. the area containing the vehicles concerned by a collision risk, the area representing a cross walk, etc). As for free space areas, it can be described as a polygon, a circle, an ellipse or a rectangle, and objectList data frame (optional): it is a list of objectID (as defined in the perceived object container) representing objects associated with this situation.

According to the embodiment illustrated in FIG. 6, the field of the perceived object container denoted situationList, for example situationList 664, can thus be simplified in comparison to situationList 464 in FIG. 4. Indeed, situationID 466 may be replaced by cpmSituationID 666 referring to the cpmSituationID of the corresponding situation addendum container 681. If many objects are associated with the same DENM, it will reduce the CPM message size by factoring the information about the DENM ID instead of repeating it for each object.

Figure 9:
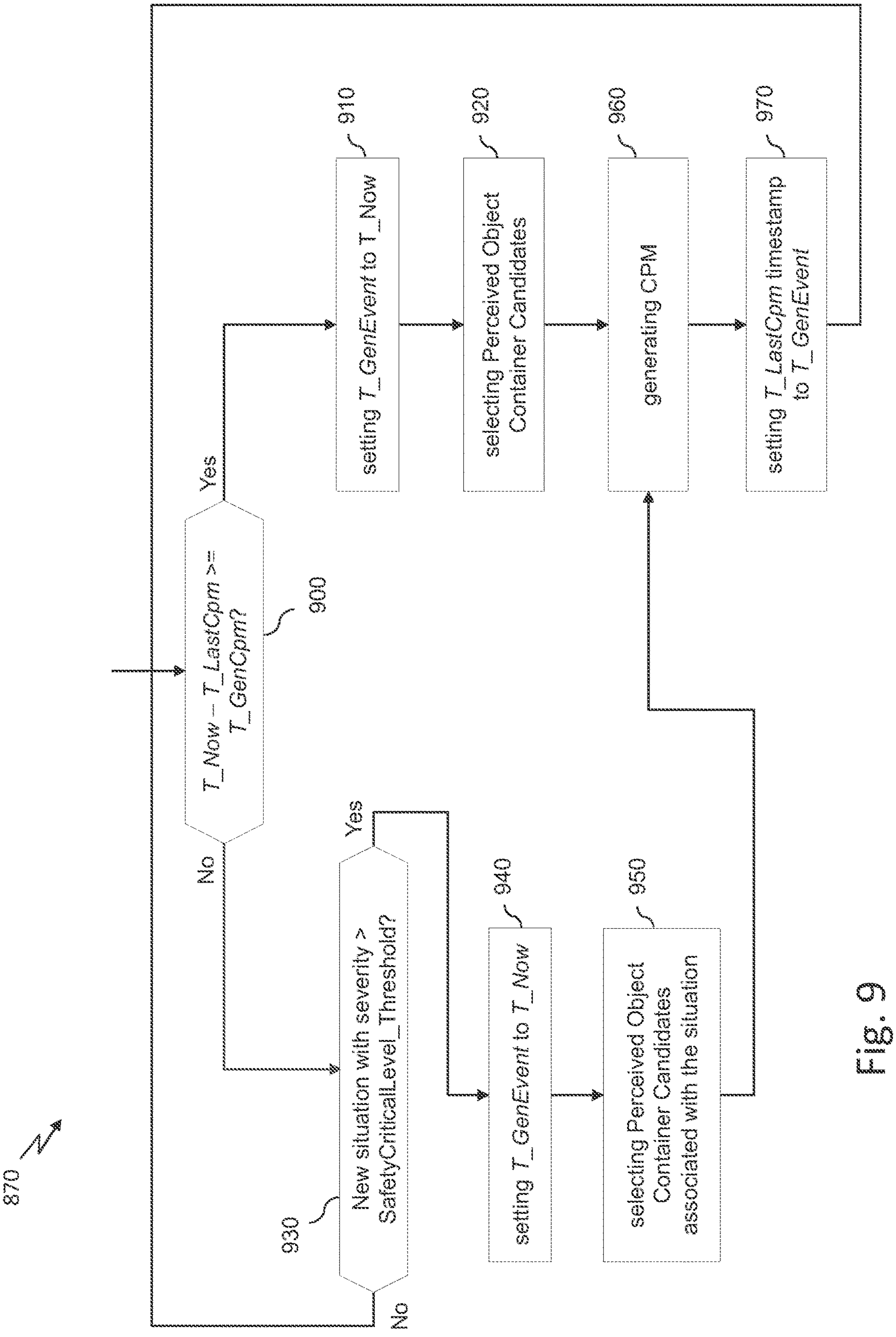
FIG. 9 illustrates, using a flowchart, an example of steps for triggering generation of a next CPM event according to some embodiments of the present disclosure.
Figure 10:
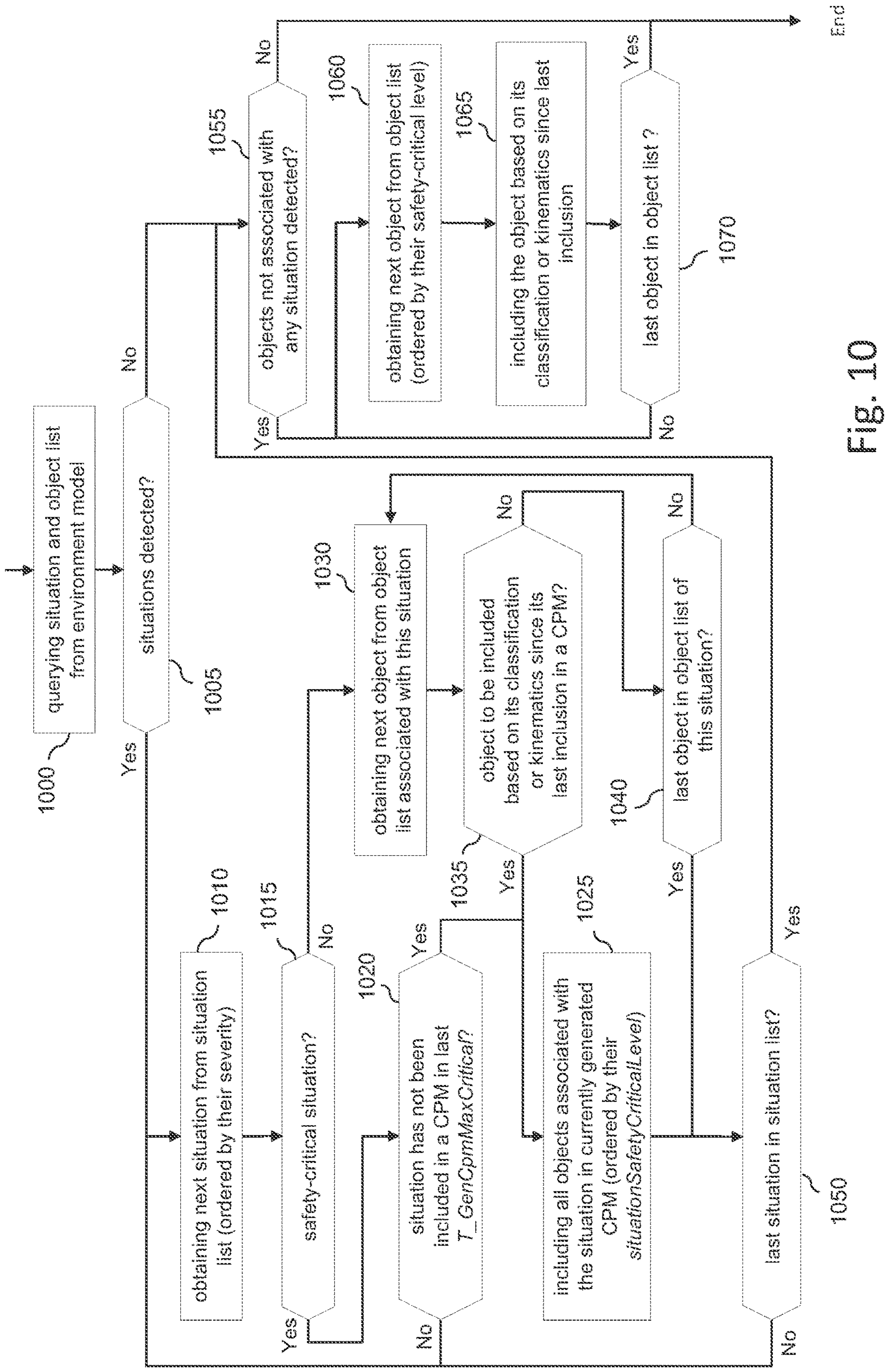
FIG. 10 illustrates, using a flowchart, an example of steps for selecting perception object container candidates for the current CPM generation event according to some embodiments of the present disclosure.

The inclusion of a situation addendum container follows the steps described in reference to FIGS. 9 and 10. The rules to include a situation addendum container are first based on the safety-critical level value of the situation. If a new situation with a safety-critical level value higher than SafetyCriticalLevel_Threshold is detected, then, in step 950 in FIG. 9, the corresponding situation addendum container is included in the same generated CPM with the associated perceived object containers with this situation. In step 1025 in the FIG. 10, when objects associated with the same situation are included in the current generated CPM, then the corresponding Situation Addendum Container is included at the same time.

FIG. 7 illustrates an example of a structure of a collective perception message, CPM, extended with a space addendum container according to some embodiments of the present disclosure.

Like CPM 400 in FIG. 4, CPM 700 comprises an ITS PDU header referenced 705, a “CPM Parameters” field 710, and a “Certificate” 715. Similarly, “CPM Parameters” field 710 contains a management container referenced 720, a station data container referenced 730, a perception data container referenced 740 containing a set of sensor information containers referenced 750, a set of perceived object containers referenced 760, and a set of free space addendum containers referenced 770.

In addition, according to the illustrated embodiment, the perception data container 740 further comprises a set of space addendum containers referenced 790.

Each space addendum container contained in the set of space addendum containers 790 is optional. It comprises a sequence of optional or mandatory data elements (DEs) which provide information of space performed by one or more sensors. More precisely, each space monitored can be reported using the structure referenced 791 comprising for example:

spaceID data element: represents a space identifier assigned to a monitored space as an object which remains constant as long as the space is perceived by the originating ITS-S. Numbers may be assigned as identifiers in an increasing round-robin fashion. When the last identifier in the allowed range has been used, the first counter for the identifier starts from the beginning of the range again, spaceState data element: a space state value indicates that the monitored space is either in a default state corresponding to the state empty (e.g. equal to 0) or not empty (e.g. value equal to or greater than 1). The default value may be 0. The possible values can also have some variations according to the SpaceType as derived from road type, and spaceArea data frame: represents the geometry on the area monitored as a space.

Optionally, space addendum container may also comprise:

spaceOccupancy data element (optional): may be used to report information about the space occupancy. It may be a value used to report on the occupancy as a global evaluation of the monitored space. For the sake of illustration, this value may be the number of vehicles detected in the space monitored by a situation analysis module such as situation analysis module 111 in FIG. 1, spaceParentID data element (optional): may be used to report the space relationship with another space. It may be considered as a subpart of this other space, using a parent identifier, spaceType data element (optional): is a value used to indicate the type of the monitored space. It can be derived from the Road attributes data element. For example, SpaceType value can be a lane, a merged lane, a diverged lane, a parking, a cross walk, or any other type of road topology. The possible values can be extended using standard EN ISO TS19091, SAE J2735, and/or spaceConfidence data element (optional): represents the confidence of the determined space state. The confidence value may be derived by the computation of the space monitoring confidence based on a sensor's or merging system's specific detection. The confidence value indicates a level of confidence of the measurement, consisting of determining presence of objects over a monitored space, for example from 0 (no confidence) to 100 (highest confidence level).

According to the embodiment illustrated in FIG. 7, information useful to improve situation awareness are provided as an optional situationInformation data frame 792 in addition to the data elements and data frames used to monitor a space area. situationInformation data frame 792 may contain information similar to those of a situation addendum container as described by reference to FIG. 6:

like the situationID defined in reference to FIG. 4, the situation information 792 can refer to a DENM ID.

Accordingly, the following optional fields should be specified: sequenceNumber, originatingStationID, and originatingMessageType, using the same field definition as described with reference to fields 466, timeOfAnalysis data element: represents the time of analysis (it is similar to the time of measurement for a perceived object). This data element corresponds to the time difference for the provided situation information with respect to the generation delta time stated in the management container of the CPM, situationType data frame (optional): represents the type of the situation. It could be similar to the DENM event types. In some variants, the situationType can be set in the space Type, situationSafetyCriticalLevel data element (optional): represents the severity of the situation, information Quality data element (optional): it is representing the quality of the information used to create the situation. For example, it may be an integer value comprised between 0 and 7, where: {unavailable(0), lowest(1), highest(7)} (0 . . . 7), and eventProbability data element (optional): represents the probability that the event will happen (e.g. for a collision risk situation).

The inclusion rules of the space addendum container may be similar to those described for the situation addendum container.

According to this embodiment, the perceived object container 793 may optionally contain a new data frame denoted spaceList and referenced 794, that can be used to associate a detected (or perceived) object with a space described in a space addendum container. The spaceList content may be similar to the situationList data frame 465 in FIG. 4, where the situationID is replaced by a spaceID.

CPM Generation and Transmission

Figure 8:
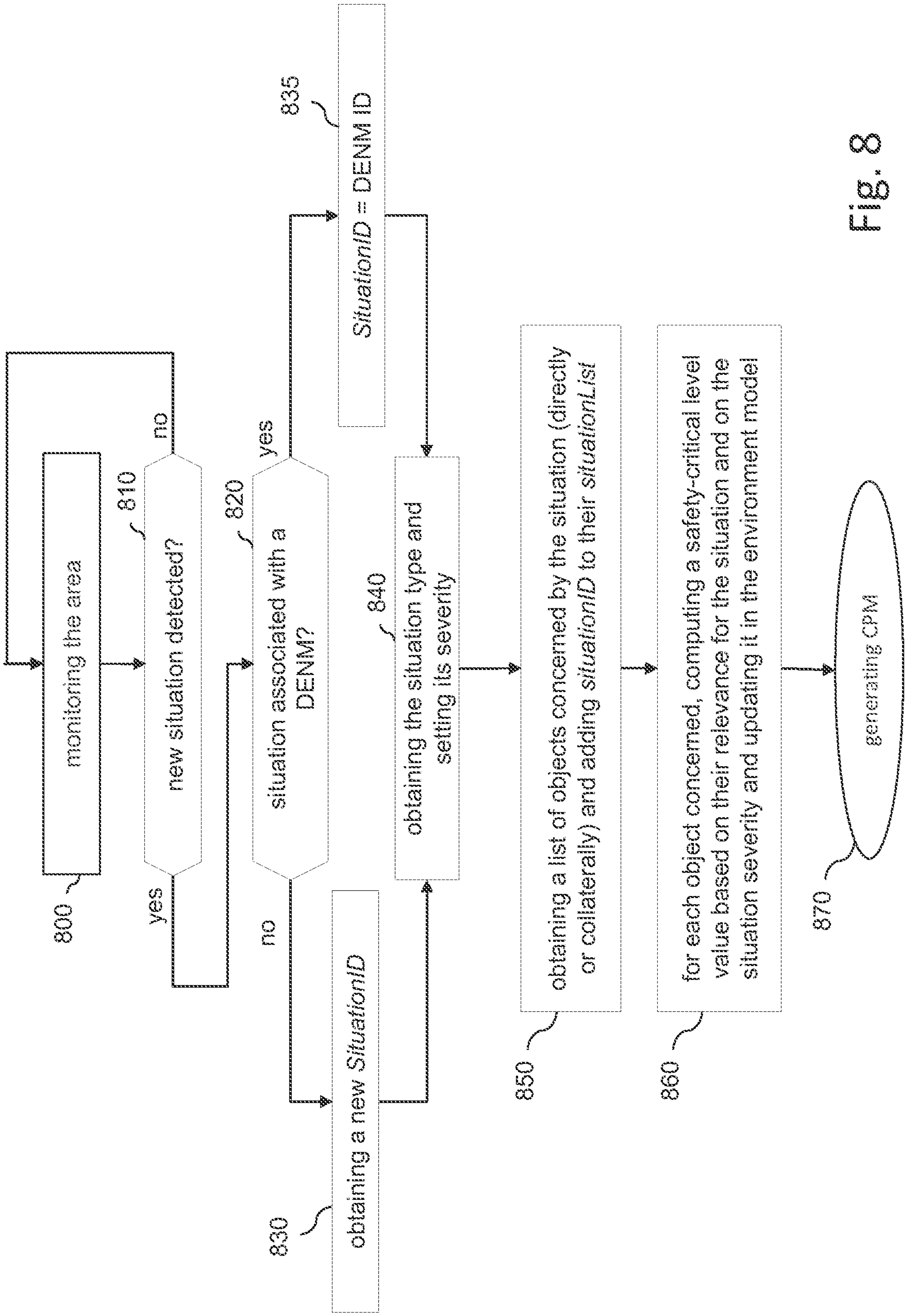
FIG. 8 schematically illustrates, using a flowchart, an example of steps of a method for generating CPMs at an originating ITS-S according to some embodiments of the present disclosure.

FIG. 8 schematically illustrates, using a flowchart, an example of steps of a method for generating CPMs at an originating ITS-S according to some embodiments of the present disclosure.

As illustrated, a first step is directed to monitoring an area associated with the considered ITS-S (step 800). Such a step may be based on a situation analysis module such as situation analysis module 240 in FIG. 2, that retrieves the list of objects from an environment model. Based on the position of the objects on the road intersection topology, on the predicted trajectories of the objects, and/or on received DENMs, the situation analysis module determines whether or not a new situation occurs (step 810). If there is no new situation, the area continues to be monitored (step 800). On the contrary, if a new situation is detected, a test is carried out to determine whether this new situation is already associated with a DENM (step 820) in order to assign a situation identifier (situationID) to the newly detected situation (step 830 or 835).

If the situation corresponds to a situation already reported in a DENM (either triggered by the R-ITS-S, e.g. R-ITS-S 112 in FIG. 1, or received from another ITS-S), then the DENM identifier (DENM actionID) is used as the situation identifier (step 835).

On the contrary, if the situation does not correspond to a DENM event, a new situation identifier is set (step 830). According to some embodiments, the situation identifier (situationID) is composed of the originating ITS-ID and of a sequence number value (sequenceNumber) assigned to the next unused value each time a new situation or event is detected by the originating ITS-S.

Next, the situation analysis module obtains the situation type (it can be obtained from the DENM event type if the situation is associated with a DENM) and sets the severity of the situation based on its type (step 840).

For the sake of illustration, an example of severities of situations is provided in Table 8 of the Appendix. It is not limitative.

Next, the situation analysis module gets the list of objects concerned by the new situation from the environment model. The corresponding situationID is then added in the situationList for all objects concerned directly or collaterally by the situation.

Figure 11:
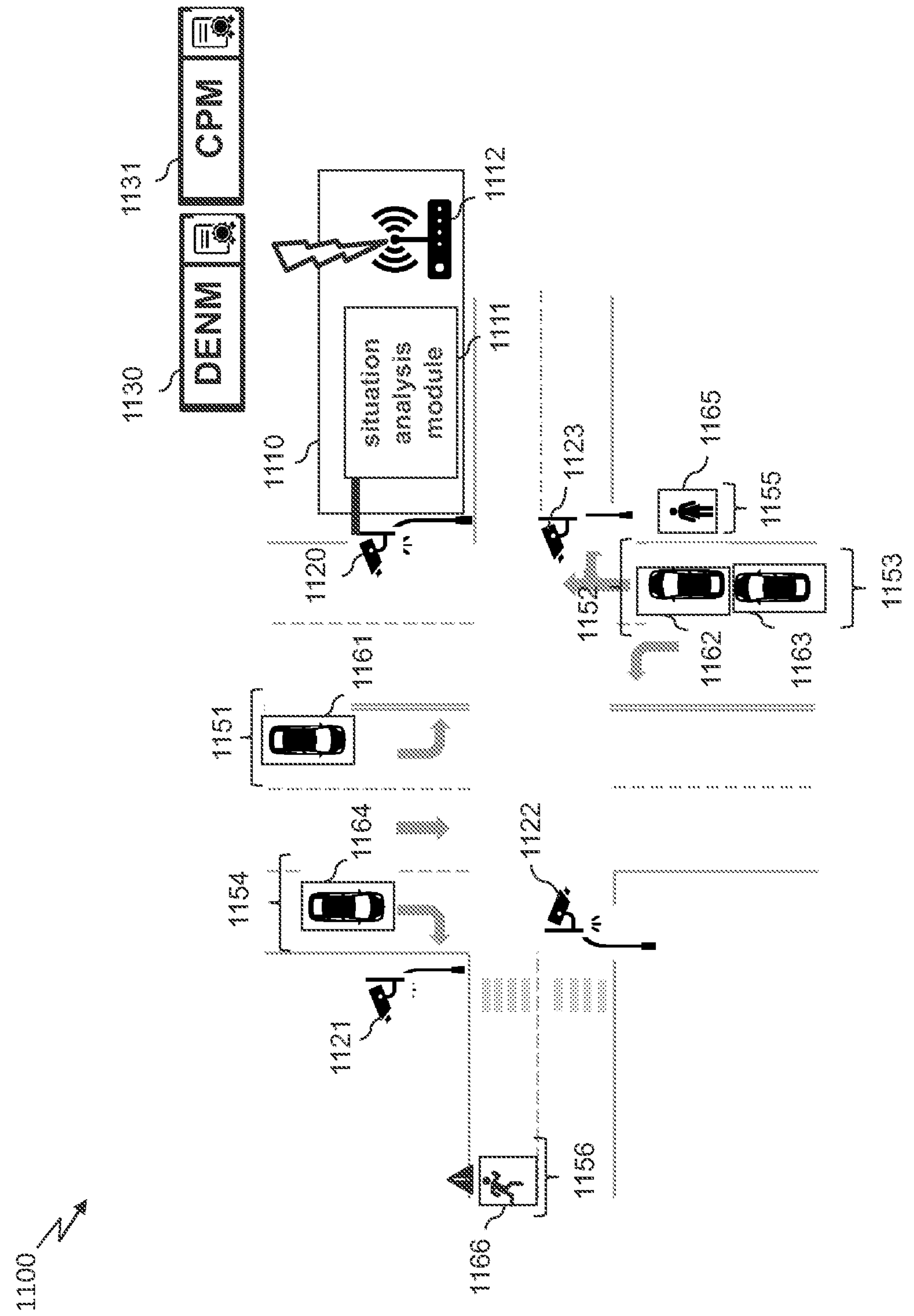
FIG. 11 illustrates an intelligent transportation system (ITS) in a situation according to which a pedestrian is present on the roadway monitored by the ITS.

For example, by reference to FIG. 11 and considering the situation according to which pedestrian 1156 is on the roadway, object 1166 (corresponding to pedestrian 1156) is directly concerned by the situation and thus, its situationID is added to the situationList corresponding to this object. Since object 1164 (corresponding to vehicle 1154) is collaterally concerned by this situation, situationID is also added in the situationList corresponding to object 1164. The same applies to objects 1262 and 1263 and to object 1265 in FIG. 12 and to objects 1362 and 1363 and to objects 1361 and 1365 in FIG. 13.

Next, the safety-critical level value of each object concerned is computed (step 860) based on the severity of the situation they belong to (obtained in step 840) and on their relevance regarding this situation. In a variant, the relevance of an object regarding a given situation is expressed as a time-to-situation value. The relevance score or the time-to-situation may be computed based on the relative distance and the relative speed of the object to the situation.

The situation analysis module continuously updates the information about the detected situations for the objects concerned in the environment model. Each time an object is leaving or joining a situation, the situation analysis module re-assesses the safety-critical level of the objects concerned and update the situationList content for the objects concerned.

When a situation is terminated (e.g. DENM termination event), then the situation analysis module deletes the situationID from the situationList of the objects concerned and re-assesses the object safety-critical levels.

Next, steps (referenced 870) are carried out to generate a CPM including updated information from the environment model. Such steps may be carried out in a CPM generation module (for example in CPM generation module 260 in FIG. 2).

According to some embodiments, the latency of a next CPM generation event is reduced when a safety-critical situation occurs and corresponding objects are reported in the next CPM.

An example of such steps for generating a CPM is provided in FIG. 9.

FIG. 9 illustrates, using a flowchart, an example of steps for triggering generation of a next CPM event according to some embodiments of the present disclosure.

It is recalled that according to standard TS 103 324 V0.0.22, the minimum time elapsing between two consecutive CPM generation events should be equal to or larger than a value denoted T_GenCpm that belongs to a range of values defined by a minimum value denoted T_GenCpmMin and a maximum value denoted T_GenCpmMax (i.e. T_GenCpmMin≤T_GenCpm≤T_GenCpmMax), where T_GenCpmMin=100 ms and T_GenCpmMax=1000 ms.

When T_GenCpm time is elapsed, i.e. when the difference between the present time (denoted T_Now) and the time at which the last CPM was generated (denoted T_LastCpm) is equal to or larger than T_GenCpm (step 900), the CPM generation event time (denoted T_GenEvent) is to set to current time T_Now (step 910). Next, the CPM generation module selects the perceived object container candidates from the environment model (step 920). The objects associated with the same situationID are candidates for inclusion in the same CPM generation event. When an object associated with a situation is marked for transmission in a next CPM, then other objects associated with this situation are also marked for transmission in the next CPM. The object inclusion rules may be those defined in standard TS 103 324 V0.0.22, based on the object classification and the object kinematics. For example, an object that is static (e.g. a vehicle stopped at a traffic light) might be reported only every 1 second. As another example, an object of class person (pedestrian) should be reported every 500 ms. Therefore, if a situation contains a static vehicle and a pedestrian, both objects might be reported every 500 ms.

However, for safety-critical situations, the latency to report about safety-critical objects should be as low as possible. Accordingly, for situations that are safety-critical, T_GenCpmMin could be a value set to T_GenCpmMinCritical=0 ms (or another value lower than current T_GenCpmMin) and T_GenCpmMax could be a value set to T_GenCpmMaxCritical=100 ms (or another value lower than current T_GenCpmMax).

According to some embodiments of the present disclosure, the situation analysis module can request, to the CPM Generation module, to generate a CPM generation event when the situation analysis module detects a new situation with a severity higher than a threshold value (denoted SafetyCriticalLevel_Threshold) or when the severity of an existing situation becomes higher than this threshold (step 930). This request can be immediate or after the minimum time delay T_GenCpmMinCritical (with T_GenCpmMinCritical<T_GenCpmMin) elapsed from the last CPM generation event. In such a case, the CPM generation event time T_GenEvent is to set to current time T_Now (step 940). Next, the CPM generation module selects the perceived object container candidates from the environment model (step 950). The perceived object container candidates are preferably those associated with the safety-critical situation. They are preferably ordered by their safety-critical level.

For the next inclusion request of objects associated with a safety-critical situation, the minimum time elapsed between consecutive CPMs is preferably equal or larger than T_GenCpm where T_GenCpmMinCritical≤T_GenCpm≤T-_GenCpmMaxCritical, where T_GenCpmMaxCritical<T_GenCpmMax. Accordingly, in a case of a safety-critical situation, objects concerned by this situation can be reported more frequently.

After having selected perceived object container candidates (step 920 or 950), a CPM is generated (step 960) and the T_LastCpm value is set to the T_GenEvent value (step 970).

In a variant, other perceived object candidates not associated with the safety-critical situation can be included in the same CPM generation event based on the object type and kinematics inclusion rules (step 950), for example using the same rules as those used in step 920.

FIG. 10 illustrates, using a flowchart, an example of steps for selecting perception object container candidates for the current CPM generation event according to some embodiments of the present disclosure. Such steps may be steps carried out in steps 920 and/or 950 in FIG. 9.

As illustrated, a first step is directed to obtaining the situation list and the object list from the environment model (step 1000).

Next, a test is carried out to determine whether the situation list comprises at least one situation identifier (step 1005). If the situation list comprises at least one situation identifier, the CPM generation module obtains the next situation ordered by their severity (step 1010), corresponding to the situation having the higher severity level when the algorithm illustrated in FIG. 10 is launched. Next, another test is carried out to determine whether the obtained situation is a safety-critical situation (step 1015). If the obtained situation is a safety-critical situation, a further test is carried out to determine whether the obtained situation has not been already included in a CPM for the last T_GenCpmMaxCritical time period (step 1020). If the obtained situation has not been already included in a CPM for the last T_GenCpmMaxCritical time period, all the objects associated with the obtained situation are selected for inclusion in the currently generated CPM. In a preferred embodiment, the objects are ordered by the situationSafetyCriticalLevel value (step 1025). In case an object is belonging to multiple situations, it is preferably reported only once in the currently generated CPM.

If the situation is not considered as safety-critical (step 1015), the objects associated with the obtained situation are obtained successively (step 1030). For each object, the inclusion rules defined in TS 103 324 V0.0.22 (in section 6.1.3.2 Perceived Object Container Inclusion Management), based on the object classification and its kinematics since its last inclusion in CPM, are checked (step 1035).

According to some embodiments of the present disclosure, if an object is to be included in the current generated CPM, then all objects associated with the same situation are selected to be included in the current generated CPM (step 1025). On the contrary, if no object associated with the situation is to be included in the current generated CPM (step 1040), then the next situation (if any) is obtained (step 1050) and the process loops to step 1010 in order to process the next situation.

Next, after having processed all the obtained situations (step 1005), the objects that are not associated with any situation are examined. To that end, a test is carried out to determine whether there is at least one object not associated with a situation (step 1055) and, if any, a first or a next object is obtained (step 1060). In a preferred embodiment, the objects obtained from the environment model are ordered by the safety-critical level (objectSafetyCriticalLevel). Next, the obtained object is included in the current generated CPM (step 1065) depending on the inclusion rules defined in TS 103 324 V0.0.22 (in section 6.1.3.2 Perceived Object Container Inclusion Management), based on its classification and its kinematics since its last inclusion in a CPM.

According to some embodiments of the disclosure (not shown in FIG. 10), the objects that are not associated with any situation but that are associated with an objectSafetyCriticalLevel that is greater than SafetyCriticalLevel_Threshold can be examined for their inclusion in a next CPM before the examination of non-safety critical situations (i.e. before steps 1030, 1035, and 1040). In such a case, the order of the inclusions of situations and/or objects within a CPM would be the following:

1) safety-critical situations and their objects,
2) safety-critical objects not associated with any situation,
3) non safety-critical situations and their objects, and
4) non safety-critical objects not associated with any situation.

As described in TS 103 324, only an object with sufficient confidence level and not subject to redundancy mitigation techniques should be selected from the object list for transmission. According to some embodiments of the present disclosure, an object associated with a safety-critical situation or with a safety-critical level higher than the SafetyCriticalLevel_Threshold value should not be subject to any kind of redundancy mitigation techniques consisting, for example, in not including by an originating ITS-S an object in a CPM if this object is already reported by the same or by other ITS-S in order to limit the congestion on the ITS radio channel.

According to some embodiments of the present disclosure, a VRU object associated with a safety-critical situation or with a safety-critical level higher than the SafetyCriticalLevel_Threshold value should not be subject to any kind of grouping for reporting in CPM and should be reported individually.

In case the size of the ASN.1 encoded CPM including all perceived object candidates selected for transmission exceeds the MTU_CPM threshold, message segmentation may occur. The objects associated with the same situation are preferable transmitted in the same message segment.

According to some embodiments of the present disclosure, CPM are generated more frequently when there exist safety-critical situations. Therefore, it is important that only ITS stations able to categorize the safety-critical objects and situations are authorized to process safety report and situation report in CPM. To that end, a R-ITS-S (e.g. R-ITS-S 112 in FIG. 1) will be authorized using the SSP described in reference to FIG. 5.

Examples of Use Cases

Figure 12:
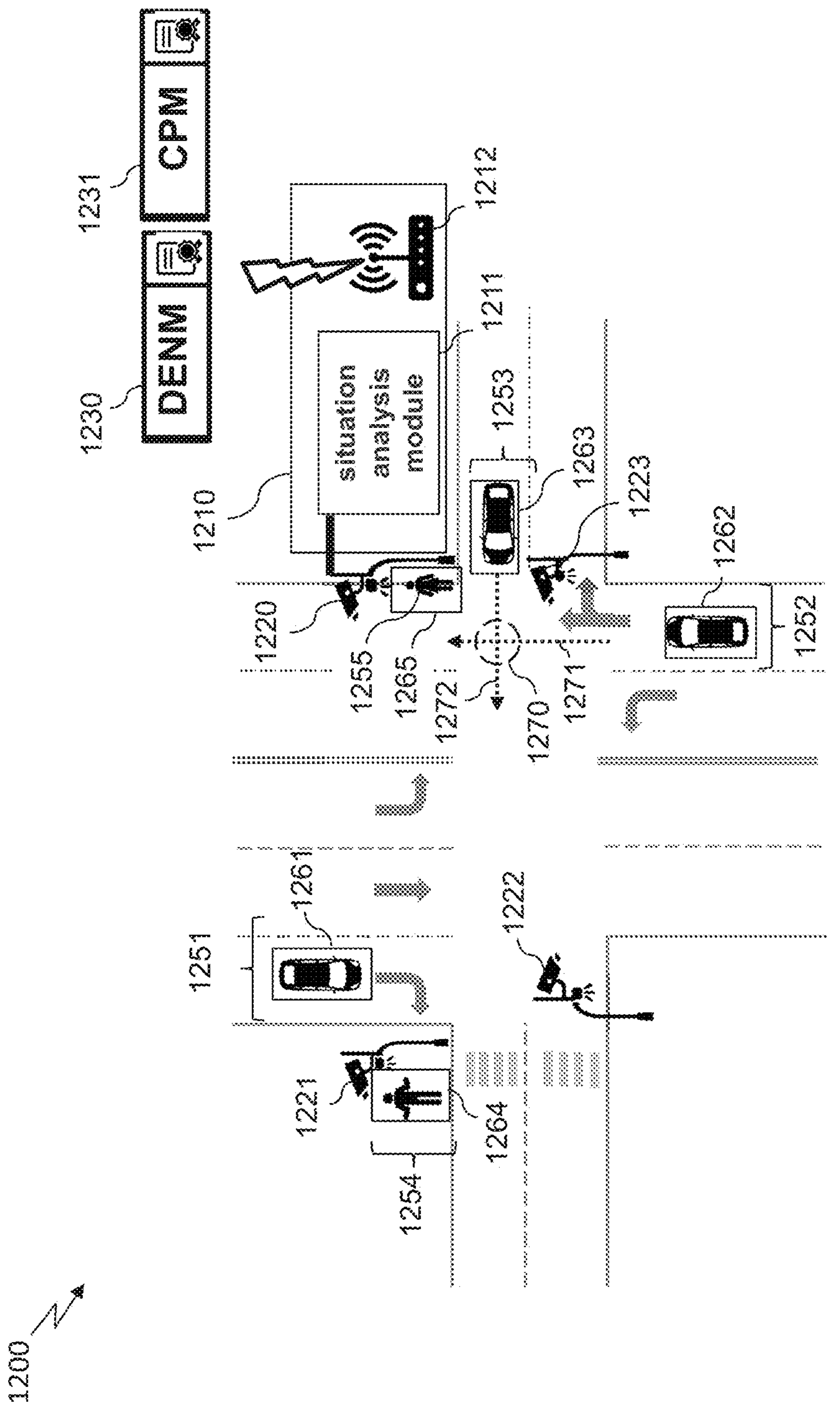
FIG. 12 illustrates an intelligent transportation system (ITS) in a situation according to which there exists a risk of collision in the area monitored by the ITS.
Figure 13:
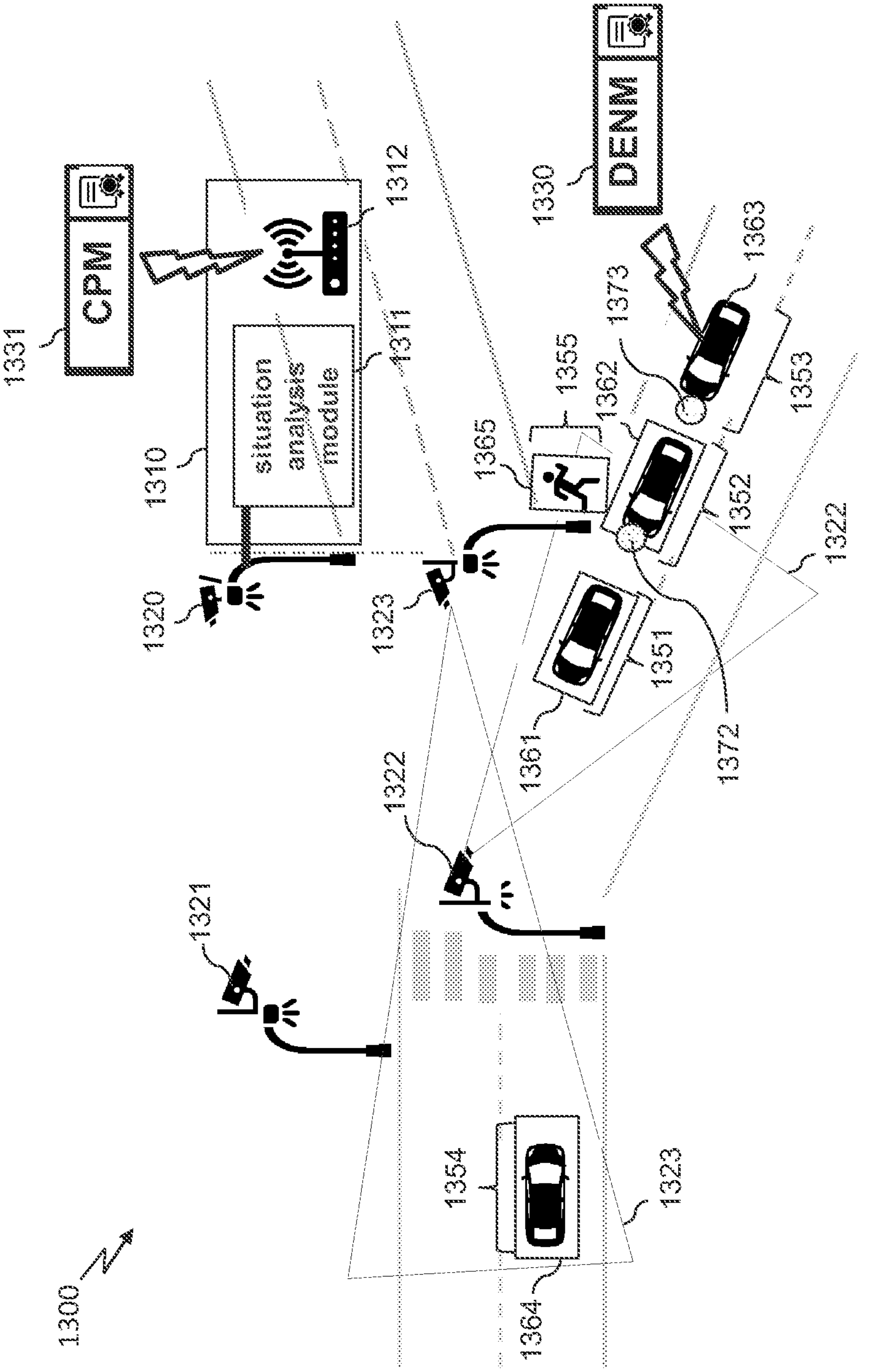
FIG. 13 illustrates an intelligent transportation system (ITS) in a situation according to which there exists a pre-crash situation in the area monitored by the ITS.

FIGS. 11, 12, and 13 illustrate three different use cases of embodiments of the present disclosure. More precisely, FIG. 11 is directed to a safety-critical situation wherein a pedestrian is present on a roadway, FIG. 12 is directed to a safety-critical situation wherein there exists a risk of collision, and FIG. 13 is directed to a safety-critical situation wherein a pre-crash DENM is generated.

Human Presence on the Road Situation

FIG. 11 illustrates an intelligent transportation system (ITS) in a situation according to which a pedestrian is present on the roadway monitored by the ITS.

For the sake of clarity and conciseness, the intelligent transportation systems, referenced 1100, is the same or is similar to the one illustrated in FIG. 1, a main difference between FIG. 1 and FIG. 11 being the presence of the pedestrian referenced 1156 on a portion of the roadway monitored by ITS 1100.

Like ITS-S 110 in FIG. 1, the originating ITS station, ITS-S, sending DENM 1130 and CPM 1131 is a road-side unit, RSU, that have more powerful resources to analyze situations than ITS-Ss of moving vehicles (e.g. a wider field of view, multiple fields of view, fast access to other information, knowledge of objects that populate the monitored area, etc.).

Again, ITS 1100 is implemented at an intersection and comprises a fixed road side unit 110 and several entities that may carry or comprise ITS station (ITS-S) each, for transmitting and or receiving ITS messages within the ITS. The several entities may be for example, the vehicles 1151, 1152, 1153, and 1154 and the pedestrians 1155 and 1156. Likewise, fixed road side unit 1110 includes a set of sensors, such as image sensors, here video cameras 1120, 1121, 1122, and 1123, and situation analysis module 1111 to analyze data provided by the sensors.

By scanning the monitored area, situation analysis module 1111 may perceive the following objects:

- objects 1161, 1162, 1163, and 1164 respectively corresponding to the vehicles 1151, 1152, 1153, and 1154 on the roadway,
- object 1165 corresponding to pedestrian 1155 on the sidewalk, and
- object 1166 corresponding to pedestrian 1156 on the roadway.

In the illustrated example, pedestrian 1156 on the roadway has a risk of collision with vehicle 1154 that will turn to its right. To cope with this situation, the situation analysis module is able to detect the presence of the pedestrian on the roadway, to analyze the trajectories of the vehicles at the intersection, and to generate CPMs to draw the attention of pedestrian 1156 and vehicle 1154 to the risk.

As illustrated, road side unit 1110 further comprises a roadside ITS-S, R-ITS-S, 1112 enabling RSU 1110 to share information relative to the perceived objects. Typically, RSU 1110 can share such information with receiving ITS stations by sending CPM 1131. It can also share information relative to a detected event via DENMs 1130.

Turning to FIG. 2 and considering that RSU 1110 corresponds to RSU 110, situation analysis module 240 continuously analyzes the presence of objects in the monitored area based on the object classification (e.g. pedestrian) and on the road topology (e.g. sidewalk, roadway). This is to analyze if a pedestrian is present on a roadway with a view of triggering an event of type "Human Presence on the Road" to the DENM generation module 270.

Furthermore, situation analysis module 240 can associate relevant objects contained in its environment model 220 to this situation of "Human Presence on the Road" and compute a safety-critical level for objects directly concerned by the situation or collaterally concerned by the situation.

In the scenario in the FIG. 11, object 1166 corresponding to pedestrian 1156 on the road, is directly concerned by the situation. Its safety-critical level is set to a "high" level. Object 1164 corresponding to vehicle 1154 is concerned by the presence of the human on the road if it turns to its right at the intersection. Its safety-critical level is then set to a "medium" level. Other objects 1161, 1162, 1163, and 1165 are not really concerned by the situation and so their safety-critical level field are set to a 0-value meaning "not-safety critical" for this situation. Both objects 1164 and 1166 are associated with the situation of generated DENM 1130. DENM 1130 is identified by the situation analysis using an identifier situationID composed of the originating ITS-S ID and a sequence number obtained from the actionID of the DENM, as explained above. The same identifier will be used by DENM generation module 270 in the actionID of the generated DENM 1130.

Table 9 in the Appendix illustrates an example of a situation analysis of the scenario described by reference to FIG. 11.

Collision Risk Situation

FIG. 12 illustrates an intelligent transportation system (ITS) in a situation according to which there exists a risk of collision in the area monitored by the ITS.

In this example the originating ITS station, ITS-S, sending DENM 1230 and CPM 1231, is a road-side unit, RSU, referenced 1210. As set forth above, RSUs have advantageously more powerful resources to analyze a collision risk situation than moving vehicles (e.g. a wider field of view, multiple fields of view, fast access to other information, knowledge of objects that populate the monitored area, etc.).

In particular, RSU 1210 has a better view than other ITS-S of the monitored area allowing RSU 1210 to detect collisions or risks of collision when mixing ITS connected and not connected colliding vehicles, and/or when colliding vehicles cannot see each other (e.g. due to an occlusion at an intersection).

Like ITS 100 in FIG. 1, ITS 1200 is implemented at an intersection and comprises fixed road side unit 1210 and several entities that may carry or comprise ITS station (ITS-S) each for transmitting and or receiving ITS messages within the ITS. The several entities may be for example, the vehicles 1251, 1252, and 1253 and the pedestrians 1254 and 1255.

According to the illustrated example, the situation analysis module 1211 may perceive the following objects when scanning the monitored area:

objects 1261, 1262, and 1263 respectively corresponding to vehicles 1261, 1262, and 1263 on the roadway and objects 1264 and 1265 respectively corresponding to pedestrians 1254 and 1255 on the sidewalk.

Still according to the illustrated example, the situation analysis module is provided with situation analysis functions to analyze the trajectories of the perceived objects, to predict their future trajectories, and to identify a possible risk of collision between the perceived objects.

In this example, perceived objects 1262 and 1263 are detected to have a risk to collide at collision position marked 1270 in the center of the road intersection. The situation analysis module is able to predict the trajectories 1271 and 1272 of the two vehicles and to compute a time-to-collision (TTC) information. The time-to-collision value may be representing a risk:

a TTC value that is lower than a first threshold, e.g. 5 seconds, but greater than a second threshold, e.g. 1.5 seconds, means that a risk of collision is detected between the two or more objects and a TTC value that is lower than the second threshold means that an imminent collision or "pre-crash" situation is detected.

In the proposed scenario of FIG. 12, RSU 1210 is the observer reporting, through DENMs, a collision risk situation. The R-ITS-S 1212 can then trigger a DENM for the event type "collision risk" or "collision risk" of the subtype "pre-crash" depending on the TTC value.

Turning to FIG. 2 and considering that RSU 1210 corresponds to RSU 110, situation analysis module 240 continuously analyzes the trajectories of the objects contained in its environment model 220. This is to predict their future trajectories 1271 and 1272 with a view of detecting risks of collision, for example risk of collision 1270.

Any trajectory predicting method can be used, including those that optionally use additional information as inputs, such as traffic conditions (traffic jam, traffic light status, speed limits), weather conditions, etc. A predicted trajectory is a set of predicted positions with associated position times defining when it is expected that the object be at the predicted position. A plurality of trajectories can be predicted for one and the same object, for instance by using various trajectory predicting methods.

Detection of a collision risk can be based on such predicted trajectories: trajectories that cross each other (given a position margin) at the same time (given a time margin) can raise a risk of collision should said time be no later than a first threshold (e.g. 5 s) and later than a second threshold (e.g. 1.5 s), can raise a pre-crash situation should said time be no later than the second threshold, or even raise an accident situation should said time be 0.

Situation analysis module 240 may decide to trigger a collision warning or pre-crash situation event to DENM generation module 270.

A collision can involve two or more objects, including one or multiple vehicles, a VRU, an animal, or an object on the road or near the road (tree, road barrier, traffic light, etc.). Those objects are labelled "critical" or "colliding" objects.

In the scenario described by reference to FIG. 12, objects 1262 and 1263 corresponding to the vehicle with a collision risk are directly concerned by the situation. Their safety-critical levels are then set to a "high" level and as they are directly concerned by the situation their time-to-situation value is set to 0-value. In a variant illustrated in Table 10 in the Appendix, the time-to-situation can be set to a value representing the time-to-collision. Object 1265 corresponding to pedestrian 1255 near the estimated collision point 1270 is also at risk by this situation. Its safety-critical level is set to a "medium" level and its time-to-situation is to set to a value in seconds (e.g. 5 seconds) computed based on the relative distance and speed of the object from the estimated collision point 1270. In a variant the time-to-situation can be set to the time-to-collision. Other objects 1261 and 1264 are not really concerned by the situation and so their safety-critical level field for this situation is set to a 0-value meaning "not-safety critical". Objects 1262, 1263, and 1265 are then associated with the situation of the generated DENM 1230. DENM 1230 is identified by the situation analysis using an identifier situationID composed of the originating ITS-S ID and a sequence number. The same identifier will be used by DENM generation module 270 in the actionID of generated DENM 1230.

Table 10 in the Appendix illustrates an example of a situation analysis of the scenario described by reference to FIG. 12.

Pre-Crash DENM Situation

FIG. 13 illustrates an intelligent transportation system (ITS) in a situation according to which there exists a pre-crash situation in the area monitored by the ITS.

In this example the originating ITS station, ITS-S, sending DENM 1330, is a vehicle ITS station, V-ITS-S, comprised in vehicle 1353, that has detected an imminent collision (TTC less than 1.5 s) with vehicle 1352, for example using its front-face sensor. DENM 1330 is a DENM for the event type "Collision Risk" with the subtype "Pre-Crash". This Pre-Crash DENM is being studied by ETSI in the pre-standardization study report TR 103 832, based on Car2Car Communication Consortium document (Triggering Conditions and Data Quality Pre-Crash Information). The Pre-Crash DENM contains information about the objects concerned by the pre-crash situation (called hereafter critical objects), the two critical objects 1372 and 1373 respectively corresponding to vehicles 1352 and 1353.

In the example illustrated in FIG. 13, situation analysis module 1311 may perceive the following objects using the sensors when scanning the monitored area:

objects 1361, 1362, and 1364 respectively corresponding to vehicles 1351, 1352, 1354 on the roadway and object 1365 corresponding to pedestrian 1355 on the sidewalk.

Turning to FIG. 2 and considering that RSU 1310 corresponds to RSU 110, situation analysis module 240 continuously analyzes the received DENMs from other ITS-Ss. Upon reception of a DENM from another ITS-S, the situation analysis module analyzes the event type. Following the DENM protocol, the R-ITS-S can forward the DENM to other ITS-S in the relevance area as specified in the received DENM.

In the scenario illustrated in FIG. 13, the ITS-S of vehicle 1353 has triggered pre-crash DENM 1330. This pre-crash DENM may contain information such as:

actionID: it represents the originating ITS-ID and a sequence number (DENM identifier), the position of the critical objects such as critical objects 1372 and 1373 on vehicles 1352 and 1353, and the speed of the critical objects.

Optionally, it may also comprise ITS-ID (stationID), for example the ITS-ID of vehicle 1352, and the time-to-collision (timeToCollision), for example to the time-to-collision between vehicles 1352 and 1353.

R-ITS-S 1312 can receive pre-crash DENM 1330 and thanks to its situation analysis module 1311, the RSU can establish a link between objects of the list of critical objects contained in the pre-crash DENM. Object 1362, corresponding to vehicle 1352, is associated with the pre-crash DENM critical object positioned at 1372. The pre-crash DENM critical object positioned at 1373, corresponding to vehicle 1353 is not perceived by the sensor of the R-ITS-S(it is outside the field of view 1322 of camera 1322), but can be added in the list of objects in environment model 220.

The situation analysis module can then analyze if the other objects contained in its environment model are concerned by the pre-crash DENM situation. Objects 1361 representing the vehicle just in front of vehicle 1352 and objects 1365 representing a VRU just near the pre-crash area are also concerned collaterally by the pre-crash DENM situation and can then be associated with it.

Table 11 in the Appendix illustrates an example of a situation analysis of the scenario described by reference to FIG. 13.

In the scenarii illustrated in FIG. 11, FIG. 12, and FIG. 13, information associated with each object concerned by the analyzed situation contained in environment model 220 can thus be updated with information items obtained from the prediction and from the situation analysis such as:

identifier of the situation (situationID) set to the actionID of the received pre-crash DENM, object safety-critical level (situationSafetyCriticalLevel and objectSafetyCriticalLevel), object predicted trajectory (objectPredictedPath), and Time-to-situation (timeToSituation).

For the sake of illustration, roadside ITS-S 1112 (R-ITS-S) can transmit the DENM warning message triggered by situation analysis module 240 using DENM generation module 270. The DENM generation module can be a state-of-the-art DENM (no modification of the DENM format, no modification of the DENM generation rules).

Roadside ITS-S 1112 (R-ITS-S) can transmit periodically CPMs using CPM generation module 260. At each CPM generation event, the list of candidate objects to be included in the next CPM are obtained from environment model 240. According to some embodiments of the present disclosure, the situation analysis module can trigger a next CPM generation event depending on the safety-critical level of a situation. This makes it possible to reduce the latency to generate CPM containing safety-critical data and then to increase the safety of the road users by improving their situation awareness with a low latency. Still according to some embodiments of the present disclosure, the CPM contains information enabling to identify rapidly which objects are associated with the situation that can correspond to a DENM. Thanks to this additional information, receiving ITS-S can improve their situation awareness more easily, and re-use the analysis already done by the originating ITS-S. This is particularly advantageous when the originating ITS-S is a R-ITS-S having more powerful analysis resources and wider and multiple fields of view.

Linking Predictions to Situations

Figure 14:
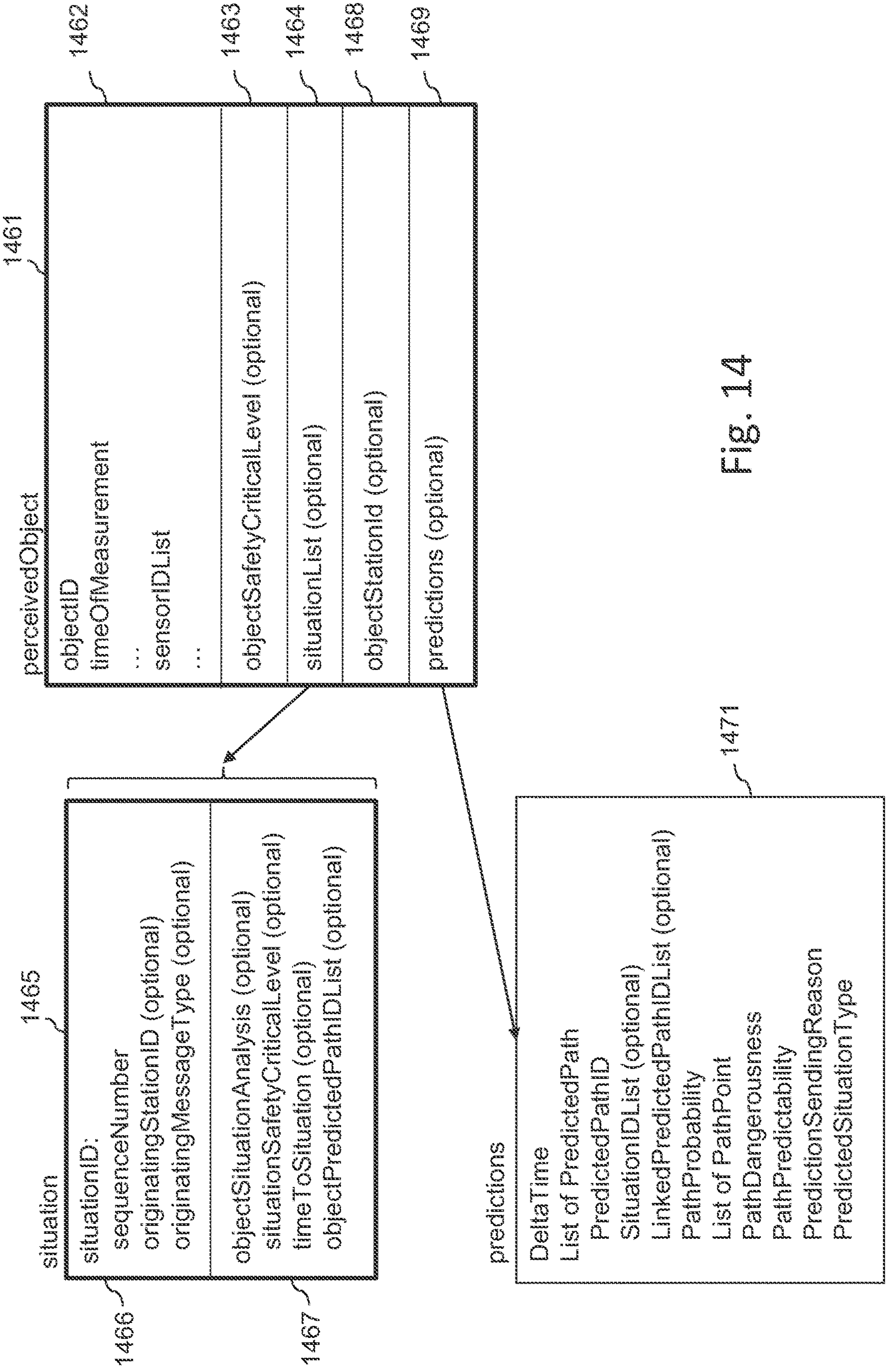
FIG. 14 illustrates an example of a structure of a perceived object element of a collective perception message, CPM, extended with prediction containers according to some embodiments of the present disclosure.

FIG. 14 illustrates an example of a structure of a perceived object element of a collective perception message, CPM, extended with prediction containers according to some embodiments of the present disclosure.

The perceived object data structure 1461 is included in a CPM, in a perceived object container, for example in perceived object container 460 in FIG. 4, in perceived object container 660 in FIG. 6, or in perceived object container 760 in FIG. 7. Like perceived object data structure 461 described by reference to FIG. 4, perceived object data structure 1461 comprises structures 1462, 1463, 1464, and 1468 that are similar to structures 462, 463, 464, and 468, respectively.

As illustrated, perceived object data structure 1461 comprises an additional container, referenced 1469, that may be used to provide information about a future state of an object (i.e. about a predicted behavior of the object), denoted a prediction container.

The data structure of prediction container 1469, referenced 1471, contains a set of information used to describe predicted information associated with a perceived object. Such predicted information may comprise one or several of the following items of information:

Delta Time, which represents the time difference between each pair of consecutive points in a predicted path (e.g. a predicted path can contain points spaced by 100 ms), list of PredictedPath, which contains one or several predicted paths. The number of paths can be up to 3 for instance. Each predicted path contains:

PathProbability, which represents the probability that an event leading to the predicted path occurs, list of PathPoints, which lists the points of a predicted path (e.g., the number of points of a predicted path can be up to 10). Each path point may be defined by:

XDistanceOffset, YDistanceOffset, which represent the distances measured from the CPM reference point in the x- and y-directions of the ITS-S coordinate system, respectively, and optional covariance information for each point can be included with XConfidence, YConfidence and Correlation.

PathDangerousness, which represents a level of dangerousness of the predicted path, PathPredictability, which represents a level of difficulty to predict the path without any advanced prediction algorithm or local knowledge, PredictionSendingReason, which represents an added-value of the prediction, which may comprise a reason of sending the predicted paths in the CPM, PredictedSituationType, which is a type of the situation associated with the predicted path, PredictedPathID, which is an identifier of a predicted path, SituationIDList, that makes it possible to associate a predicted path with a situation or a list of situations by referencing the corresponding identifier of the situation (SituationID), that may be described, for example, in the data structure 1465 in FIG. 14, and LinkedPredictedPathIDList, which makes it possible to associate (explicitly or implicitly) a predicted path with another object predicted path or several objects predicted paths to reflect the possible interactions between object predictions. To that end, this field may contain a list of PredictedPathID. The relationship type could also be reflected by adding a link type information (e.g. "parent").

According to the illustrated example, the situation data structure 1465 is similar to the situation data structure 465 in FIG. 4 and contains a first set of elements situationID 1466 that is similar to data structure 466 in FIG. 4. Since an object can be associated with multiple situations, the items of information related to an object/situation association can be provided in a data frame such as data frame 1467 (i.e. objectSituationAnalysis), that is similar, in part, to data frame 467 described by reference to FIG. 4 and to data frame 667 described by reference to FIG. 6.

It is possible to set a safety-critical level information that is relevant to a specific situation (e.g. situationSafetyCriticalLevel). In addition, it is possible to set a time-to-situation (e.g. timeToSituation) and a reference to a predicted path or to a set of predicted paths (objectPredictedPathIDList) for which the considered object may be concerned by the situation (i.e., several paths may be predicted for the same object and the same situation). According to some particular embodiments, the set of predicted paths (objectPredictedPathIDList) defined in the situation structure may comprise predicted paths of other objects (i.e., objects different from the one associated with the considered perceived object container), making it possible to link one or more predicted paths of an object to one or more predicted paths of another object. This may lead to reducing the size of CPMs.

According to some other embodiments, it is possible to include similar items of information (i.e., objectPredictedPathIDList) in a situation data structure similar to situation data structure 666 of FIG. 6, to link one or more object predicted paths to a situation.

Still according to particular embodiments, it is possible to omit the situation data structure to reduce the CPM size. Accordingly, linking predicted paths of two objects (through the data element LinkedPredictedPathIDList) creates an implicit situation (the situation being a group of object predicted paths). Tables 13 and 14 in the Appendix illustrate examples of some portions of CPMs transmitting predicted paths of perceived objects and links between some of these predicted paths, without situation data per se.

Still according to some embodiments, one or more predicted paths associated with one or more objects may be associated with a situation associated with one or more predicted paths of the considered object in the data element situationIDlist (within the predictions data structure, for example within predictions data structure 1471). Accordingly, a link between different predicted paths associated with different perceived objects and with the same situation may be established by analyzing the corresponding perceived object containers. Examples of links between predicted paths associated with perceived objects and situations and between predicted paths associated with perceived objects with each other is illustrated in Table 12.

According to some particular embodiments, linking one or several predicted paths associated with an object different from the object associated with the considered structure, denoted the first predicted paths, to one or several predicted paths associated with the object associated with the considered structure, denoted the second predicted paths, without any further indication, means that the first predicted paths may result from the second predicted path (i.e., the first predicted paths may become true if the second predicted path becomes true). A particular indication, for example 'parent', may be used to indicate that the first predicted paths may lead to the second predicted paths, as apparent from the examples provided in Table 12. According to this example, predicted path 1581 is indicated to be the parent for predicted path 1591 and predicted path 1582 is indicated to be the parent for predicted paths 1592 and 1593.

Establishing a link between several object predicted paths, for example by establishing a link between these object predicted paths and a situation, makes it possible to reflect the interactions between the objects concerned by the same situation, thus avoiding reporting independently these objects and their predicted paths by the collective perception service. Although a link between different predicted paths of different objects may be established by analyzing several CPMs, two predicted paths should be preferably included in the same CPM if one of these predicted paths refers to the other.

In order to secure V2X communications within the ITS, a public-key-infrastructure (PKI) as defined in the version 1.1.1 of the ETSI TS 102 731 specification may be used, in particular to control the integrity of a message and to authenticate an originating ITS-S, as described by reference to FIG. 5.

Accordingly, an additional specific permission may be defined within the certificate to be used so as to authorize reporting of predicted information such as data element 1471 in FIG. 14. According to the example illustrated in FIG. 5 with reference 550, the fourth bit of the second byte may be set to 1 for indicating a permission for reporting predicted information (such as data element 1471 in FIG. 14) in the payload of the CPM, otherwise it may be set to 0.

Figure 15:
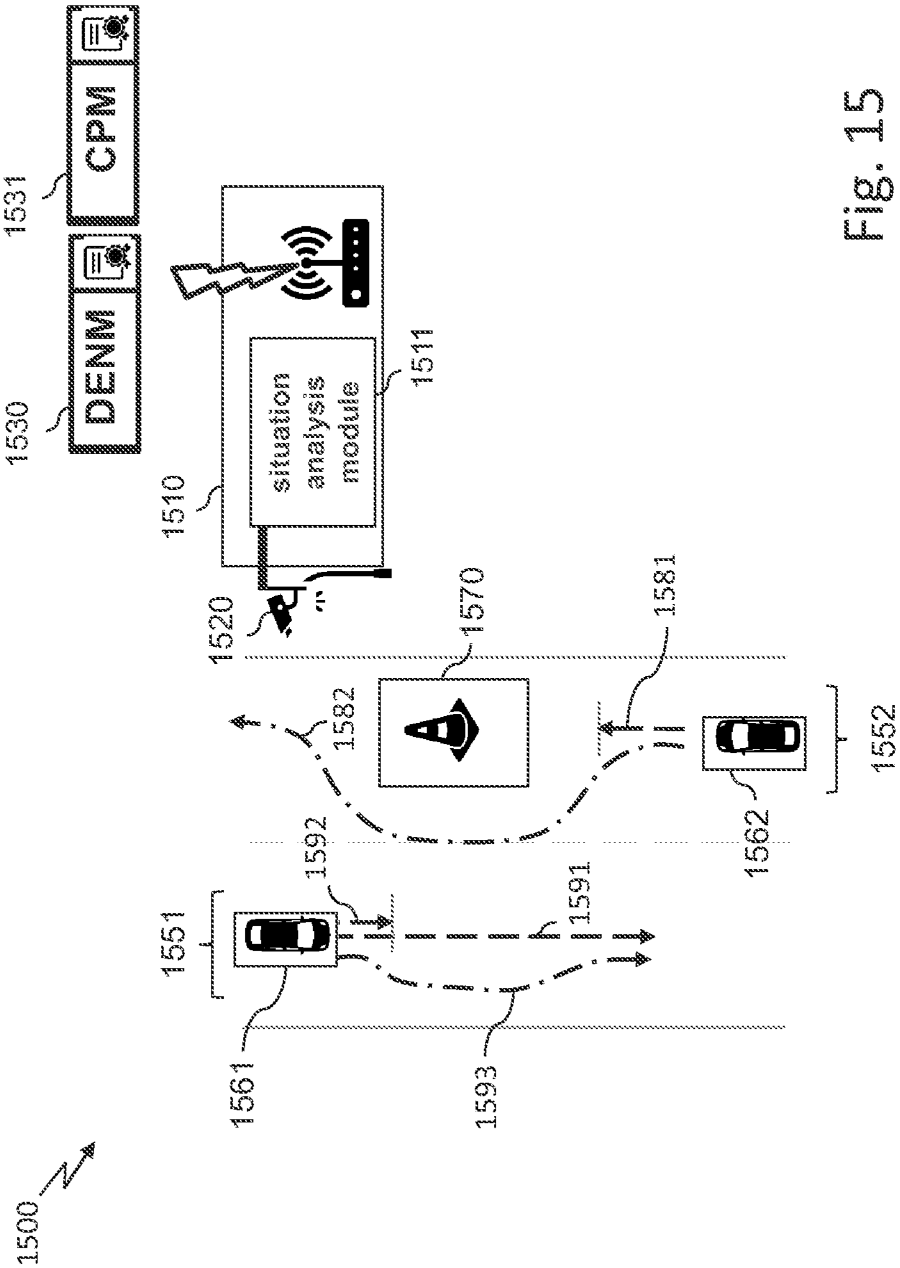
FIG. 15 illustrates an intelligent transportation system (ITS) in a situation according to which two vehicles have interactions on the roadway monitored by the ITS.

FIG. 15 illustrates an intelligent transportation system (ITS) in a situation wherein the behavior of one vehicle located on a roadway monitored by the ITS may affect the behavior of another vehicle also located on the roadway monitored by the ITS.

For the sake of clarity and conciseness, the intelligent transportation systems, referenced 1500, is similar to the one illustrated in FIG. 1, a main difference between FIG. 1 and FIG. 15 being directed to the presence of some obstacles such as construction work 1570 on a portion of the roadway monitored by ITS 1500.

Like RSU 110 in FIG. 1, the RSU comprising the originating ITS station illustrated in FIG. 15, referenced 1510, sending DENM 1730 and CPM 1731, comprises more processing resources to analyze situations than ITS-Ss embedded within moving vehicles (e.g. a wider field of view, multiple fields of view, fast access to other information, knowledge of objects that populate the monitored area, etc.).

As illustrated, ITS 1500 is implemented on the side of a roadway and comprises stationary road side unit 1510 and several entities that may carry or comprise an ITS station (ITS-S) each, for transmitting and/or receiving ITS messages within the ITS. The several entities may be, for example, the vehicles referenced 1551 and 1552. Like stationary road side unit 110, stationary road side unit 1510 comprises a set of sensors, such as image sensors, here video camera 1520, and situation analysis modules, here situation analysis module 1511, to analyze data provided by the sensors.

By scanning the monitored area, situation analysis module 1511 may perceive objects 1561 and 1562, respectively corresponding to vehicles 1551 and 1552 on the roadway.

As illustrated in FIG. 15, vehicle 1552 has obstacle 1570 (e.g., construction work) on its path on the roadway. To handle this situation, situation analysis module 1511 is able to detect the presence of vehicle 1552 on the roadway, approaching obstacle 1570, and the presence of vehicle 1551 on the opposite lane.

Based on previous vehicle behaviors in the monitored area, the situation analysis module can predict with a certain probability the different possible trajectories of vehicles facing obstacle 1570 on the roadway. For instance, vehicle 1552 may have two possible behaviors:

- stopping in front of obstacle 1570 and waiting until vehicle 1551 has passed the area where the obstacle is located, which corresponds to predicted path 1581 (represented with an arrow in a regular dashed line) and
- forcing the way and bypassing the obstacle immediately, which corresponds to predicted path 1582 (represented with an arrow in a chain line).

As apparent from FIG. 15, the behavior of vehicle 1552 affects the behavior of vehicle 1551. For instance, if vehicle 1552 stops before passing the obstacle (predicted path 1581), then vehicle 1551 can continue its trajectory normally according to predicted path 1591 (represented with an arrow in regular dotted line). Assuming predicted path 1581, a high probability of occurrence may be associated with predicted path 1591. Alternatively, if vehicle 1552 forces the way (assuming predicted path 1582), then the situation analysis module can determine, still based on previous monitored trajectories in the monitored roadway, a possible set of predicted paths such as:

- stopping and letting vehicle 1552 pass before continuing, which corresponds to predicted path 1592 (represented with a short arrow of dashed line) and
- driving on the right side of the road (e.g., on a cycle lane if it exists) to avoid a collision with vehicle 1552, which corresponds to predicted path 1593 (represented with an arrow in a chain line).

According to this scenario, situation analysis module 1511 may create two different situations:

- situation 1 (illustrated with regular dashed arrows in FIG. 15) wherein predicted path 1581 associated with vehicle 1552 is linked to predicted path 1591 associated with vehicle 1551 and
- situation 2 (illustrated with chain line arrows in FIG. 15) wherein predicted path 1582 associated with vehicle 1552 is linked to predicted paths 1592 and 1593 associated with vehicle 1551.

According to some embodiments, RSU 1510 generates CPM 1531 containing the predicted paths and their relationships by associating the predicted paths with the situations. The content of some portions of this CPM according to a particular embodiment of the disclosure is shown in Table 12.

According to other embodiments of this disclosure, RSU 1510 generates CPM 1531 containing the predicted paths and their relationships by associating the predicted paths with each other, without referring explicitly to the identified situations 1 and 2 by the situation analysis module, in order to reduce the size of the CPM. The content of some portions of this CPM according to this particular embodiment of the disclosure is shown in Table 13 and in Table 14. It is noted that a main difference between Table 13 and Table 14 is that Table 14 does not comprise any parent indication. Accordingly, as apparent from Table 14, the LinkedPredictedPathIDList associated with a predicted path is empty if this predicted path has no parent.

According to this invention, DENM 1530 of the Collision Risk type can be triggered for situation 2, in parallel to generating CPM 1531.

It is observed that using prior art methods leads to transmitting independently all the predicted paths, for each object. Therefore, the receivers have to perform additional analysis to understand what are the global possible predicted scenarios. According to the embodiments described by reference to FIGS. 14 and 15, a receiving ITS-S can easily analyse the possible interactions between objects through the relationships between the predicted paths of these objects when receiving CPM 1531 and associated DENM 1530. For example, if the predicted path 1582 in FIG. 15 becomes true, then the probability that the predicted path 1592 or 1593 becomes true is very high. Moreover, associated DENM 1530 (Risk of Collision) would alert the ITS receiving station so that it can anticipate the mitigation actions associated with this risk.

Figure 16:
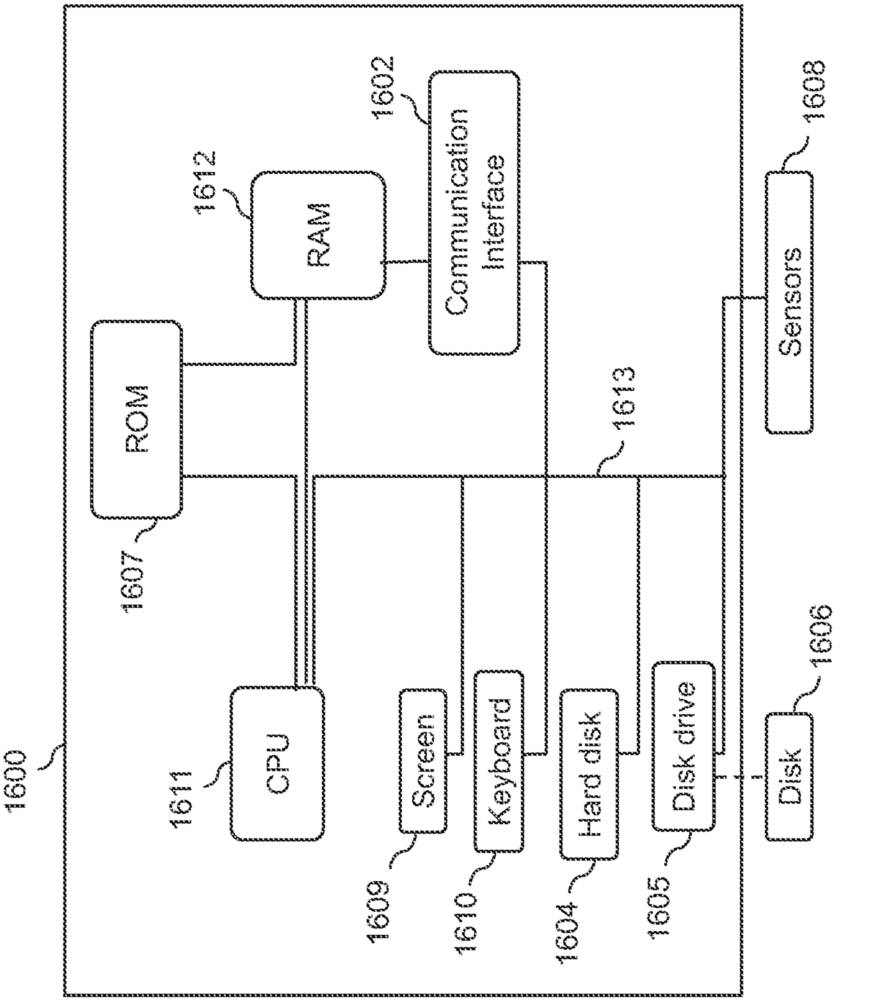
FIG. 16 is a schematic representation of an example of a communication ITS-S device configured to implement some embodiments of the present disclosure.

Example of a Hardware to Carry Out Steps of the Method of Embodiments of the Present Disclosure FIG. 16 is a schematic representation of an example of a communication ITS-S device configured to implement some embodiments of the present disclosure. It may be either an ITS-S embedded in a vehicle or in a road side unit, for example in road side unit 110 in FIG. 1.

The communication device 1600 may preferably be a device such as a microcomputer, a workstation, or a light portable device embedded in a vehicle or a RSU. The communication device 1600 comprises a communication bus 1613 to which there are preferably connected:

- a central processing unit 1611, such as a microprocessor, denoted CPU or a GPU (for graphical processing unit),
- a read only memory 1607, denoted ROM, for storing computer programs for implementing some embodiments of the disclosure,
- a random access memory 1612, denoted RAM, for storing the executable code of methods according to some embodiments of the disclosure as well as the registers adapted to record variables and parameters necessary for implementing methods according to some embodiments of the disclosure, and
- at least one communication interface 1602 connected to the radio communication network over which ITS messages are transmitted. The ITS messages are written from a FIFO sending memory in RAM 1612 to the network interface for transmission or are read from the network interface for reception and writing into a FIFO receiving memory in RAM 1612 under the control of a software application running in the CPU 1611.

Optionally, the communication device 1600 may also include one or several of the following components:

- a data storage means 1604 such as a hard disk, for storing computer programs for implementing methods according to one or more embodiments of the disclosure;
- a disk drive 1605 for a disk 1606, the disk drive being adapted to read data from the disk 1606 or to write data onto said disk;
- a screen 1609 for serving as a graphical interface with the user, by means of a keyboard 1610 or any other pointing means.

The communication device 1600 may be optionally connected to various peripherals including perception sensors 1608, such as for example a digital camera, each being connected to an input/output card (not shown) so as to supply data to the communication device 1600.

Preferably the communication bus provides communication and interoperability between the various elements included in the communication device 1600 or connected to it. The representation of the bus is not limiting and in particular the central processing unit is operable to communicate instructions to any element of the communication device 1600 directly or by means of another element of the communication device 1600.

The disk 1606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read-only memory 1607, on the hard disk 1604 or on a removable digital medium such as for example a disk 1606 as described previously. According to an optional variant, the executable code of the programs can be received by means of the communication network, via the interface 1602, in order to be stored in one of the storage means of the communication device 1600, such as the hard disk 1604, before being executed.

The central processing unit 1611 is preferably adapted to control and direct the execution of the instructions or portions of software code of the program or programs according to some embodiments of the disclosure, which instructions are stored in one of the aforementioned storage means. On powering up, the program or programs that are stored in a non-volatile memory, for example on the hard disk 1604 or in the read only memory 1607, are transferred into the random access memory 1612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular, the different features from different embodiments may be interchanged, where appropriate.

Certain of the embodiments of the invention described above may be implemented solely or as a combination of a plurality of the embodiments. Also, features from different embodiments can be combined where necessary or where the combination of elements or features from individual embodiments in a single embodiment is beneficial.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

APPENDIX

TABLE 1

(example of a format of a safety-critical level expressed as a value, using ASN.1)

| Descriptive Name | objectSafetyCriticalLevel |
|---|---|
| ASN.1 representation | SafetyCriticalLevel ::= INTEGER {<br>notSafetyCritical (0), -- the safety critical level is set to 0, no safety-risk detected<br>SafetyCritical (1), -- the detected object has a safety risk<br>} (0..1)<br>or<br>SafetyCriticalLevel ::= INTEGER {<br>notSafetyCritical (0), -- the safety critical level is set to 0, no safety-risk detected<br>lowSafetyCritical (1), -- the detected object has a low level of safety risk<br>mediumSafetyCritical (2), -- the detected object has a medium level of safety risk<br>highSafetyCritical (3), -- the detected object has a high level of safety risk<br>} (0..15) |
| Definition | Describes the safety-critical level value of a detected object.<br>This DE is optional. |
| Unit | Not applicable |

TABLE 2

(example of a format of a safety-critical level expressed as a percentage value, using ASN.1)

| Descriptive Name | objectSafetyCriticalLevel |
|---|---|
| ASN.1 representation | SafetyCriticalLevel ::= INTEGER {<br>notSafetyCritical (0), -- the safety critical level is set to 0, no safety-risk detected<br>onePercent (1),<br>oneHundredPercent (100),<br>unavailable (101) -- In case the level value computation is not available<br>} (0..101) |
| Definition | Describes the safety-critical level value of a detected object.<br>This DE is optional. |
| Unit | percent |

TABLE 3

(example of a format of a situation list data frame, using ASN.1)

| Descriptive Name | situationList |
|---|---|
| ASN.1 representation | SituationList ::= SEQUENCE SIZE(1..128, ...) OF Situation |
| Definition | Contains a list of situations associated with the detected object. A detected object can be associated with more than one situation at the same time.<br>This DF is optional. |
| Unit | Not applicable |

TABLE 4

(example of a format of a situation data frame, using ASN.1)

| Descriptive Name | situation |
|---|---|
| ASN.1 representation | Situation ::= SEQUENCE {<br>situationID SituationID, -- identifier of a situation, can refer to a DENM actionID<br>objectSituationAnalysis ObjectSituationAnalysis OPTIONAL<br>-- object information related to the situation<br>} |
| Definition | Represents a situation and the analysis of the object regarding this situation.<br>This DF should include the information:<br>situationID DF<br>objectSituationAnalysis DF |
| Unit | Not applicable |

TABLE 5

(example of a format of a situation identifier data frame, using ASN.1)

| Descriptive Name | situationID |
|---|---|
| ASN.1 representation | SituationID ::= SEQUENCE {<br>sequenceNumber SequenceNumber, -- Identifier of the situation INTEGER (0..65535)<br>originatingStationID StationID OPTIONAL, -- If the situation is detected from<br>-- another ITS station message (e.g. a DENM), ID of this ITS station<br>originatingMessageType MessageID OPTIONAL -- Type of message used to detect the<br>-- situation (e.g. DENM)<br>}<br>MessageID ::= INTEGER{ denm(1), cpm(15)} (0..255) -- Same messageID codes as in ITS PDU Header |
| Definition | Identifier of a situation. The situationID contains at least a sequence number used as an identifier of the situation. It can refer to a DENM ID (actionID: composed of an ITS ID and a sequence number).<br>It is composed of:<br>sequenceNumber DE: The sequenceNumber in the situationID shall be set to a next unused value each time a new situation or event is detected by the originating ITS-S.<br>originatingStationID optional DE: The identifier of an ITS station that has triggered an ITS message used to detect the situation (e.g. ITS ID in a received DENM)<br>originatingMessageType optional DE: Type of the message if the situation is detected from another ITS message (e.g. DENM, CPM) |
| Unit | Not applicable |

TABLE 6

(example of a format of an objectSituationAnalysis data frame, using ASN.1)

| Descriptive Name | objectSituationAnalysis |
|---|---|
| ASN.1 representation | ObjectSituationAnalysis ::= SEQUENCE {<br>situationSafetyCriticalLevel SafetyCriticalLevel OPTIONAL,<br>timeToSituation TimeToSituation OPTIONAL,<br>objectPredictedPath ObjectPredictedPath OPTIONAL<br>}<br>TimeToSituation ::= INTEGER { directlyConcernedByTheSituation (0), oneSecBeforeSituation (1) } (0..100) |
| Definition | Contains information specific to the object for the situation. As an object can belong to multiple situations at the same time, some information concerning the analysis of the object for this situation are then linked to the situation in the DF composed of:<br>situationSafetyCriticalLevel optional DE: safety-critical level of the detected object for the situation. If an object belongs to multiple situations at the same time, this field can be used to specify a different value than the one set at the object level by objectSafetyCriticalLevel. An object could then be set as “not safety-critical” for a first situation and set as “safety-critical” for a second situation. |

TABLE 6-continued

| (example of a format of an objectSituationAnalysis data frame, using ASN.1) | |
|---|---|
| Descriptive Name | objectSituationAnalysis |
| | timeToSituation optional DE: representing the relevance of the object to the situation. Expressed as a time to situation in seconds. objectPredictedPath optional DF: set of PathPoints corresponding to the predicted path of the object related to this situation; for a same object multiple paths can be predicted, then the relevant one for the situation can be reported here. |
| Unit | Not applicable |

TABLE 7

| (example of a format of an objectStationID data frame, using ASN.1) | |
|---|---|
| Descriptive Name | objectstationID |
| ASN.1 representation | ObjectStationId ::= SEQUENCE {<br>stationID StationID,<br>confidence StationIDConfidence<br>}<br>StationIDConfidence ::= INTEGER { zeroPercent (0), onePercent (1), hundredpercent (100), unknown (101) } (0..101) |
| Definition | ITS-ID of the detected objects if available with the confidence level of the association between the detected object and the ITS-ID.<br>This DF is optional.<br>It is authorised to be included in the Perceived Object Container, when the object is a safety-critical object. |
| Unit | Not applicable |

TABLE 8

(example of severities of situations)

| Situation severity | Example of situation types |
|---|---|
| 0 | Not safety critical situation (e.g. tolling lane) |
| 1 | Traffic jam, slow vehicle |
| 2 | Stationary vehicle, roadworks, extreme weather conditions |
| 3 | Wrong way driving, pre-crash, collision risk, accident, human presence on the road |

TABLE 9

(example of a situation analysis for the scenario described by reference to FIG. 11

| objectID | Concerned by the pre-crash situation? | Safety-critical level | Time-to-situation |
|---|---|---|---|
| 161 | No | Not-safety critical for this situation | Not applicable |
| 162 | No | Not-safety critical for this situation | Not applicable |
| 163 | No | Not-safety critical for this situation | Not applicable |
| 164 | Collaterally | Medium | 5 s |
| 165 | No | Not-safety critical for this situation | Not applicable |
| 166 | Directly | High | 0 s |

TABLE 10

(example of a situation analysis for the scenario described by reference to FIG. 12)

| objectID | Concerned by the collision risk situation? | Safety-critical level | Time-to-situation |
|---|---|---|---|
| 261 | No | Not-safety critical for this situation | Not applicable |
| 262 | Directly | High | 3 s (time-to-collision) |
| 263 | Directly | High | 3 s (time-to-collision) |
| 264 | No | Not-safety critical for this situation | Not applicable |
| 265 | Collaterally | Medium | 5 s |

TABLE 11

(example of a situation analysis for the scenario described by reference to FIG. 13)

| objectID | Concerned by the pre-crash situation? | Safety-critical level | Time-to-situation |
|---|---|---|---|
| 361 | Collaterally | Medium | 3 s |
| 362 | Directly | High | 0 s |
| 363 | Directly | High | 0 s |
| 364 | No | Not-safety critical for this situation | — |
| 365 | Collaterally | Medium | 2 s |

TABLE 12

(example of content of some portions of a CPM transmitting predicted paths of perceived objects and links between some of these predicted paths and with associated situations)

| | | |
|---|---|---|
| Perceived Object ID | 1562 | |
| SituationList for 1562 | SituationID | 1 |
| | objectSituationAnalysis | 1581 |
| | objectPredictedPathIDList | |
| | SituationID | 2 |
| | objectSituationAnalysis | 1582 |
| | objectPredictedPathIDList | |
| Prediction container with a List of Predicted Paths for 1562 | PredictedPathID | 1581 |
| | SituationIDList | 1 |
| | LinkedPredictedPathIDList | 1591 |
| | Predicted PathID | 1582 |
| | SituationIDList | 2 |
| | LinkedPredictedPathIDList | 1592, 1593 |
| Perceived object ID | 1561 | |
| SituationList for 1561 | SituationID | 1 |
| | objectSituationAnalysis | 1591 |
| | objectPredictedPathIDList | |
| | SituationID | 2 |
| | objectSituationAnalysis | 1592, 1593 |
| | objectPredictedPathIDList | |
| Prediction container with a List of Predicted Paths for 1561 | PredictedPathID | 1591 |
| | SituationIDList | 1 |
| | LinkedPredictedPathIDList | 1581-Parent |
| | PredictedPathID | 1592 |
| | SituationIDList | 2 |
| | LinkedPredictedPathIDList | 1582-Parent |
| | PredictedPathID | 1593 |
| | SituationIDList | 2 |
| | LinkedPredictedPathIDList | 1582-Parent |

TABLE 13

(example of content of some portions of a CPM transmitting predicted paths of perceived objects and links between some of these predicted paths)

| | | |
|---|---|---|
| Perceived Object ID | 1562 | |
| Prediction container with a List of Predicted Paths for 1562 | PredictedPathID | 1581 |
| | LinkedPredictedPathIDList | 1591 |
| | PredictedPathID | 1582 |
| | LinkedPredictedPathIDList | 1592, 1593 |
| Perceived object ID | 1561 | |
| Prediction container with a List of Predicted Paths for 1561 | PredictedPathID | 1591 |
| | LinkedPredictedPathIDList | 1581-Parent |
| | PredictedPathID | 1592 |
| | LinkedPredictedPathIDList | 1582-Parent |
| | PredictedPathID | 1593 |
| | LinkedPredictedPathIDList | 1582-Parent |

TABLE 14

(example of content of some portions of a CPM transmitting predicted paths of perceived objects and links between some of these predicted paths)

| | | |
|---|---|---|
| Perceived Object ID | 1562 | |
| Prediction container with aList of Predicted Paths for 1562 | PredictedPathID | 1581 |
| | PredictedPathID | 1582 |

TABLE 14-continued (example of content of some portions of a CPM transmitting predicted paths of perceived objects and links between some of these predicted paths)

| | | |
|---|---|---|
| Perceived object ID | 1561 | |
| Prediction container with a List of Predicted Paths for 1561 | PredictedPathID | 1591 |
| | LinkedPredictedPathIDList | 1581 |
| | PredictedPathID | 1592 |
| | LinkedPredictedPathIDList | 1582 |
| | PredictedPathID | 1593 |
| | LinkedPredictedPathIDList | 1582 |

The invention claimed is:

1. A method of communication in an Intelligent Transport System (ITS), comprising, at an originating ITS station, ITS-S:

in response to detecting at least one situation involving at least one object detected within an area monitored by the ITS, generating and transmitting a Collective Perception Message (CPM), wherein the generated CPM comprises a reference to the at least one object and an indication to indicate that the at least one object is involved in the at least one situation and wherein the generated CPM further comprises a situation safety level representing a risk level of the at least one situation, further comprising determining whether the situation safety level is higher than a situation safety threshold and, in response to determining that the situation safety level is higher than the situation safety threshold, decreasing the minimum time elapsing between two consecutive CPM generation events.

2. An Intelligent Transport System, ITS, station, ITS-S, comprising at least one microprocessor configured for carrying out each step of the method of claim 1.

3. A non-transitory computer-readable medium storing a program which, when executed by a microprocessor or computer system in an Intelligent Transport System station, ITS-S, causes the ITS-S to perform each step of the method of claim 1.

4. A method of communication in an Intelligent Transport System (ITS), comprising, at an originating ITS station (ITS-S):

in response to detecting at least one situation involving at least one object detected within an area monitored by the ITS, generating and transmitting a Collective Perception Message (CPM), wherein the generated CPM comprises a reference to the at least one object and an indication to indicate that the at least one object is involved in the at least one situation, further comprising disabling any mechanism preventing a same object to be referenced in consecutive CPMs and/or disabling any grouping mechanism, depending on an object safety level and/or a situation safety level.

5. An Intelligent Transport System station (ITS-S), comprising at least one microprocessor configured for carrying out each step of the method of claim 4.

6. A non-transitory computer-readable medium storing a program which, when executed by a microprocessor or computer system in an Intelligent Transport System station (ITS-S), causes the ITS-S to perform each step of the method of claim 4.

* * * * *